(12) United States Patent
Yamashita et al.

(10) Patent No.: US 8,085,243 B2
(45) Date of Patent: Dec. 27, 2011

(54) INPUT DEVICE AND ITS METHOD

(75) Inventors: Atsushi Yamashita, Osaka (JP);
Tomohiro Terada, Osaka (JP); Takuya Hirai, Osaka (JP)

(73) Assignee: Panasonic Corporation, Osaka (JP)

( * ) Notice: Subject to any disclaimer, the term of this patent is extended or adjusted under 35 U.S.C. 154(b) by 776 days.

(21) Appl. No.: 12/278,123

(22) PCT Filed: Feb. 1, 2007

(86) PCT No.: PCT/JP2007/051725
§ 371 (c)(1),
(2), (4) Date: Aug. 1, 2008

(87) PCT Pub. No.: WO2007/088942
PCT Pub. Date: Aug. 9, 2007

(65) Prior Publication Data
US 2009/0167682 A1    Jul. 2, 2009

(30) Foreign Application Priority Data
Feb. 3, 2006   (JP) .................................. 2006-027316

(51) Int. Cl.
*G06F 3/033* (2006.01)
(52) U.S. Cl. ........................................ 345/158; 345/156
(58) Field of Classification Search ........... 345/156–175
See application file for complete search history.

(56) References Cited

U.S. PATENT DOCUMENTS
6,191,773 B1    2/2001  Maruno et al.
7,259,747 B2 *  8/2007  Bell ............................. 345/156
2002/0041327 A1*  4/2002  Hildreth et al. ................. 348/42
2002/0064382 A1*  5/2002  Hildreth et al. ............... 396/100
2004/0046736 A1*  3/2004  Pryor et al. ................... 345/156

FOREIGN PATENT DOCUMENTS
| JP | 4-262414 | 9/1992 |
| JP | 9-77622 | 3/1997 |
| JP | 9-185456 | 7/1997 |
| JP | 2000-6687 | 1/2000 |
| JP | 2005-141151 | 6/2005 |

OTHER PUBLICATIONS

International Search Report issued May 1, 2007 in the International (PCT) Application of which the present application is the U.S. National Stage.

* cited by examiner

*Primary Examiner* — Vijay Shankar
(74) *Attorney, Agent, or Firm* — Wenderoth, Lind & Ponack, L.L.P.

(57) ABSTRACT

An input device for inputting a command and information to a device, includes a body shape input section acquiring body shape information of a user and a display information generation section generating a display image necessary for the user to input the command and the information. Further, the input device includes an operation section having an operation surface corresponding to the display image, a body shape extraction section extracting a portion corresponding to the operation surface from the body shape information acquired by the body shape input section and generating a body image, an image composition section making a composite image of the display image generated by the display information generation section and the body image generated by the body shape extraction section, and a display section displaying the composite image made by the image composition section.

12 Claims, 22 Drawing Sheets

F I G. 1 9
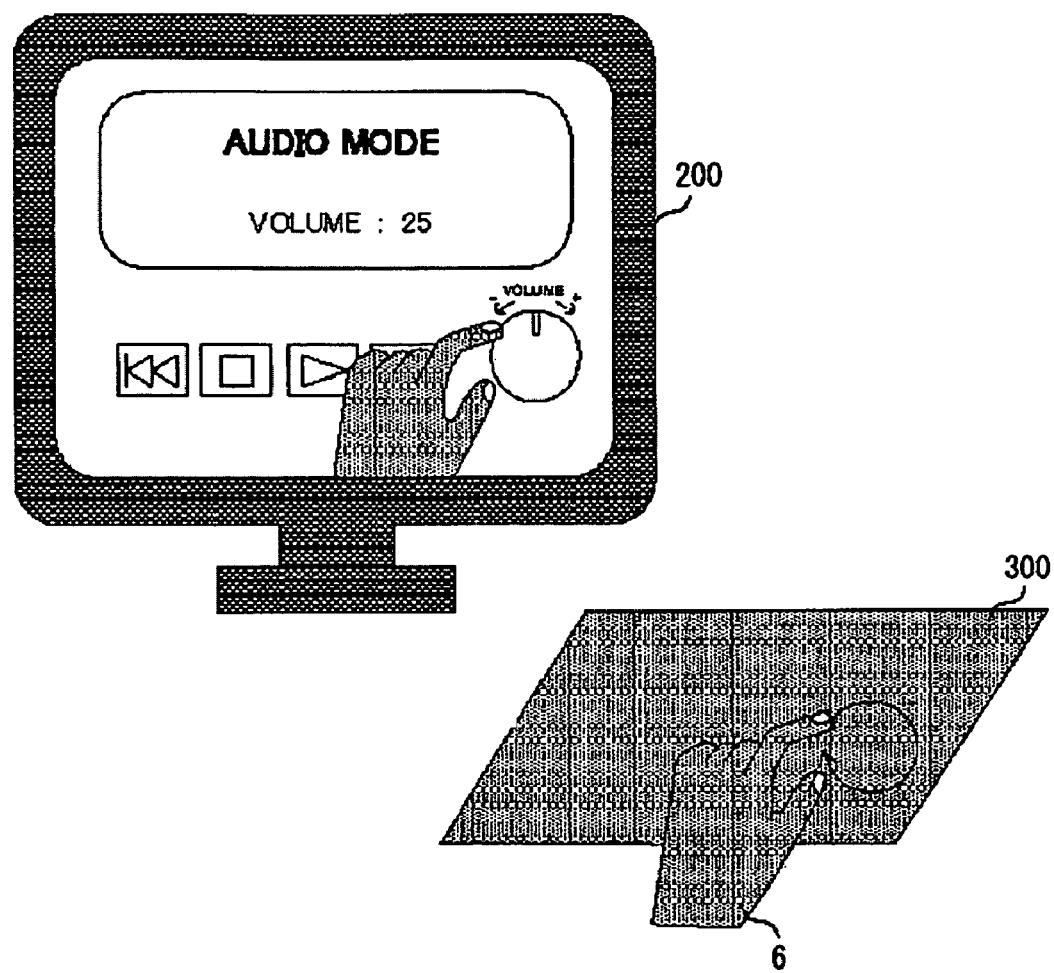

WHEN DETECTING LEFT HAND

WHEN DETECTING NORMAL HAND

WHEN DETECTING OBJECT, NOT HAND OR DETECTING HAND OF CHILD

DISPLAY HAND SHAPE WITHOUT CHANGE IN COMPOSITE MANNER

FIG. 27B  DISPLAY ONLY CONTOUR OF HAND SHAPE IN COMPOSITE MANNER
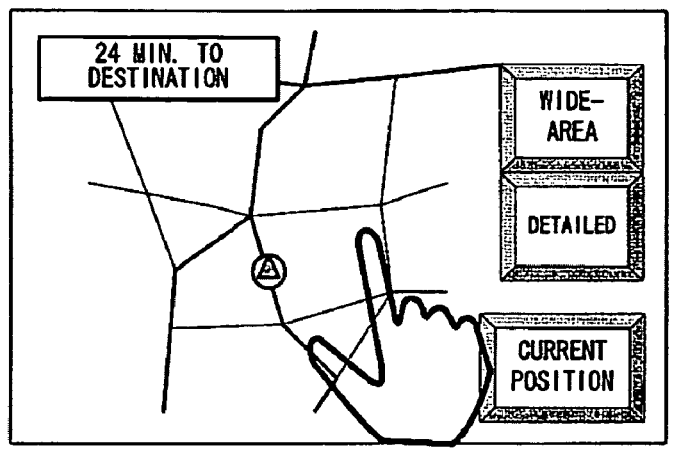
FIG. 27C  MAKE HAND SHAPE SEMI-TRANSPARENT AND DISPLAY IT WITH ITS CONTOUR IN COMPOSITE MANNER
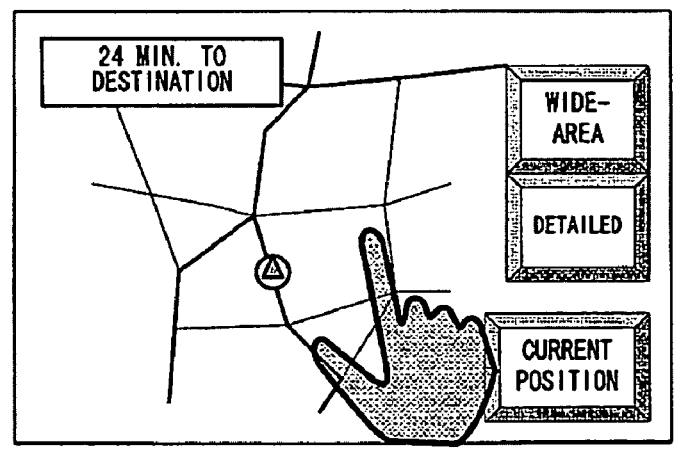
FIG. 27D  DISPLAY ONLY FINGERTIPS IN HIGHLIGHTED MANNER WHILE DISPLAYING ONLY CONTOUR
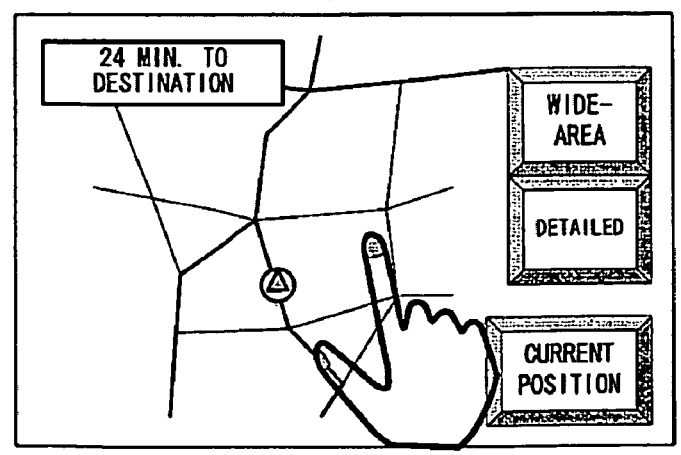

FIG. 27E  ADD SHADOW TO HAND SHAPE PORTION
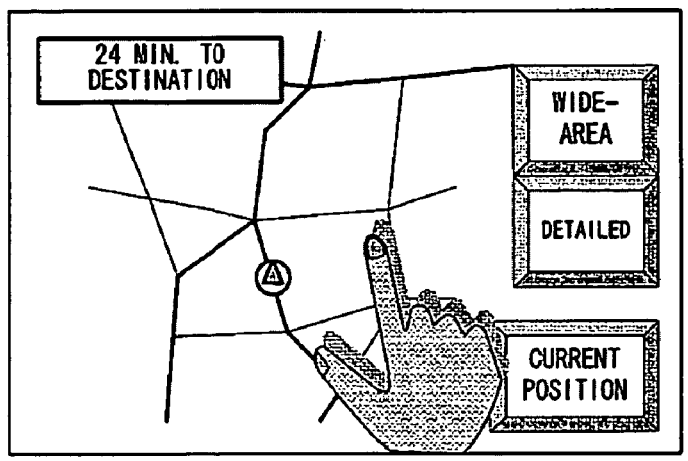
FIG. 27F  WHEN INDICATING BUTTONS HIDDEN BEHIND HAND BY POP-UP HINTS
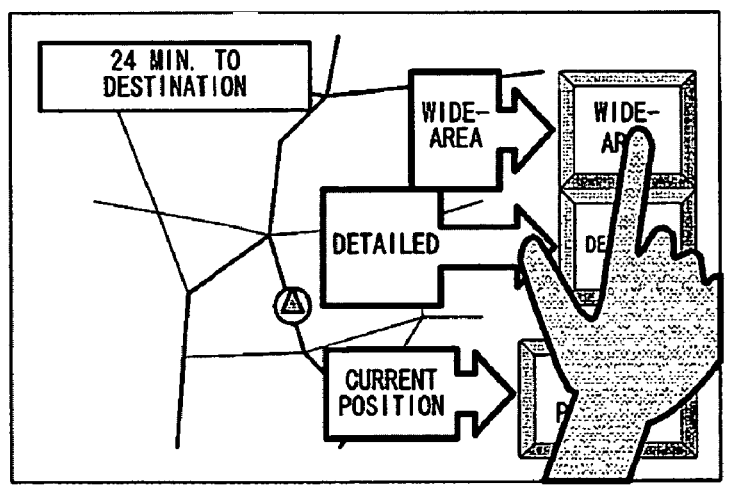
FIG. 27G  WHEN OVERDRAWING CHARACTERS HIDDEN BEHIND HAND
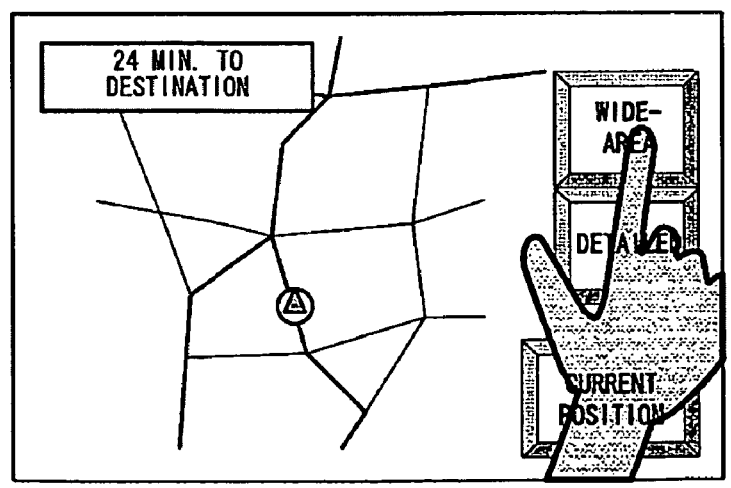

DISPLAY CONTACTED/PRESSED
BUTTON IN HIGHLIGHTED MANNER

DISPLAY CONTACTED/PRESSED
POSITION IN HIGHLIGHTED MANNER

DISPLAY IN COMPOSITE MANNER ONLY
IN RANGE OF GUI TO BE OPERATED (TV SCREEN)    (NAVIGATOR SCREEN)

(WHEN DISPLAYING GUI TO BE OPERATED)

INPUT DEVICE AND ITS METHOD

TECHNICAL FIELD

The present invention relates to an input device for allowing a user to input a command and information to a device, and its method, and particularly relates to an input device for allowing a user to input a command and information using his/her body such as a hand based on information displayed on a display and the like, and its method.

BACKGROUND ART

Conventionally, as an input device for allowing a user to input a command and information using his/her finger and the like based on information displayed on a display screen such as a display, devices are disclosed in, for example, Patent Document 1 and Patent Document 2. These devices each capture a touch panel operation surface by grid matrix type scanning means or a camera, extract a hand shape portion from the acquired data, and display a composite image of the hand shape portion and a GUI (Graphical User Interface) and the like displayed on a display. Based on the above-described structure, the user can, without once moving the line of sight to a touch panel installed remotely from the display screen and seeing the touch panel with his/her own eyes while driving, input the command and the information while viewing the image of an operating finger virtually displayed on the display screen.

Additionally, by using the devices disclosed in Patent Document 1 and Patent Document 2, the hand shape of the user may be acquired by pattern matching from an image captured by the camera, and thus it is possible to allow the user to operate the device after the hand shape of the user is recognized as a hand shape, and also it is possible to interpret the user input by sensing a gesture which is time-varying patterns of the hand shape and the hand position of the user.

Patent Document 1: Japanese Laid-Open Patent Publication No. 9-77622

Patent Document 2: Japanese Laid-Open Patent Publication No. 2000-6687

DISCLOSURE OF THE INVENTION

Problems to be Solved by the Invention

However, the above-described conventional input interface has the following disadvantages. In the devices disclosed in Patent Document 1 and Patent Document 2, to sense the hand shape or the gesture of the user by pattern matching, the user's hand is required to be included within the operation surface which is a capture range. For example, while the user operates the operation surface on the near side thereof, since the portion closer to the user than the base of fingers is outside the capture range, the user's hand is not recognized as a hand. As a result, it is impossible to perform a process of allowing a certain operation after recognizing the user's hand as a hand.

Further, even when an intuitive gesture-based operation such as waving a hand left and right to cancel the last operation is introduced, the user is required to make a gesture, always aware that his/her hand is included within the operation surface. Thus, it is impossible to construct an easy-to-use interface.

The present invention is directed to solving the above problems. That is, an object of the present invention is to provide an input device capable of, even when a user's hand goes beyond an operation surface, performing input by accurately sensing a hand shape and a gesture, and its method.

Solution to the Problems

To achieve the above object, the present invention has the following aspects.

A first aspect of the present invention is directed to an input device for inputting a command and information to a device. The present invention includes: a body shape input section for acquiring image data of a wider range than an operation surface of an operation section for receiving an operation input from a user; a body shape extraction section for recognizing a shape of a body portion from the image data, extracting a portion corresponding to an operation range of the operation surface from the image data, and generating a body image; a display image generation section for generating display image which is display range corresponding to the operation range of the operation surface and which is necessary for the user to input the command and the information; an image composition section for making a composite image of the display image generated by the display image generation section and the body image generated by the body shape extraction section; a display section for displaying the composite image made by the image composition section; and a calculation section for recognizing the operation input performed on the operation surface of the operation section by the user, or recognizing from the image data an operation input performed on the device by a gesture of the user.

It is preferable that the body shape extraction section determines, by pattern matching using shape patterns of the body portion which are stored in advance, whether or not the shape extracted from the image data outputted from the body shape input section is the shape of the body portion.

It is preferable that based on the shape patterns, the body shape extraction section corrects the shape of the body portion which is detected from the image data outputted from the body shape input section.

It is preferable that a marker is put at a predetermined position on the operation section so as to be used in a shape correction process, and that the body shape extraction section performs the shape correction process such that the position of the marker included in the image data outputted from the body shape input section is converted into a predetermined position on a screen of the display section.

It is preferable that in accordance with the shape of the body portion which is recognized by the body shape extraction section, the display image generation section changes the display image to be generated. It is preferable that only when the shape of the body portion which is recognized by the body shape extraction section is a shape of a right hand or a shape of a left hand, the display image generation section generates the display image.

It is preferable that based on the shape of the body portion which is recognized by the body shape extraction section, the display image generation section displays a GUI component included in the display image in a highlighted manner, changes a position of the GUI component, or changes a validity of the GUI component.

It is preferable that the display image generation section generates the display image including a plurality of display areas divided based on operation targets, and that the image composition section detects a fingertip portion of the user in the body image and makes the composite image of the display image and the body image in only a display area in which the detected fingertip portion is present.

It is preferable that the display image generation section generates the display image including a plurality of display areas divided based on operation targets, and that the image composition section reduces the body image and makes the composite image of the reduced body image and the display image in an area which is a current operation target.

A second aspect of the present invention is directed to an input method for inputting a command and information to a device. The present invention includes: a body shape inputting step of acquiring image data of a wider range than an operation surface of an operation section for receiving an operation input from a user; a body shape extracting step of recognizing a shape of a body portion from the image data, extracting a portion corresponding to an operation range of the operation surface from the image data, and generating a body image; a display image generating step of generating a display image which is a display range corresponding to the operation range of the operation surface and which is necessary for the user to input the command and the information; an image composition step of making a composite image of the display image generated in the display image generating step and the body image generated in the body shape extraction step; a display step of displaying the composite image made in the image composition step; and a calculating step of recognizing the operation input performed on the operation surface of the operation section by the user, or recognizing from the image data an operation input performed on the device by a gesture of the user.

Effect of the Invention

As described above, the present invention can provide an input device capable of, even when the hand of a user goes beyond an operation surface, performing input by accurately sensing a hand shape and a gesture, and its method.

BRIEF DESCRIPTION OF THE DRAWINGS

FIG. 19 shows an example of the operation section 300.

FIG. 27B shows an example of the composite image made by the image composition section 800.

FIG. 27C shows an example of the composite image made by the image composition section 800.

FIG. 27D shows an example of the composite image made by the image composition section 800.

FIG. 27E shows an example of the composite image made by the image composition section 800.

FIG. 27F shows an example of the composite image made by the image composition section 800.

FIG. 27G shows an example of the composite image made by the image composition section 800.

Figure 1:
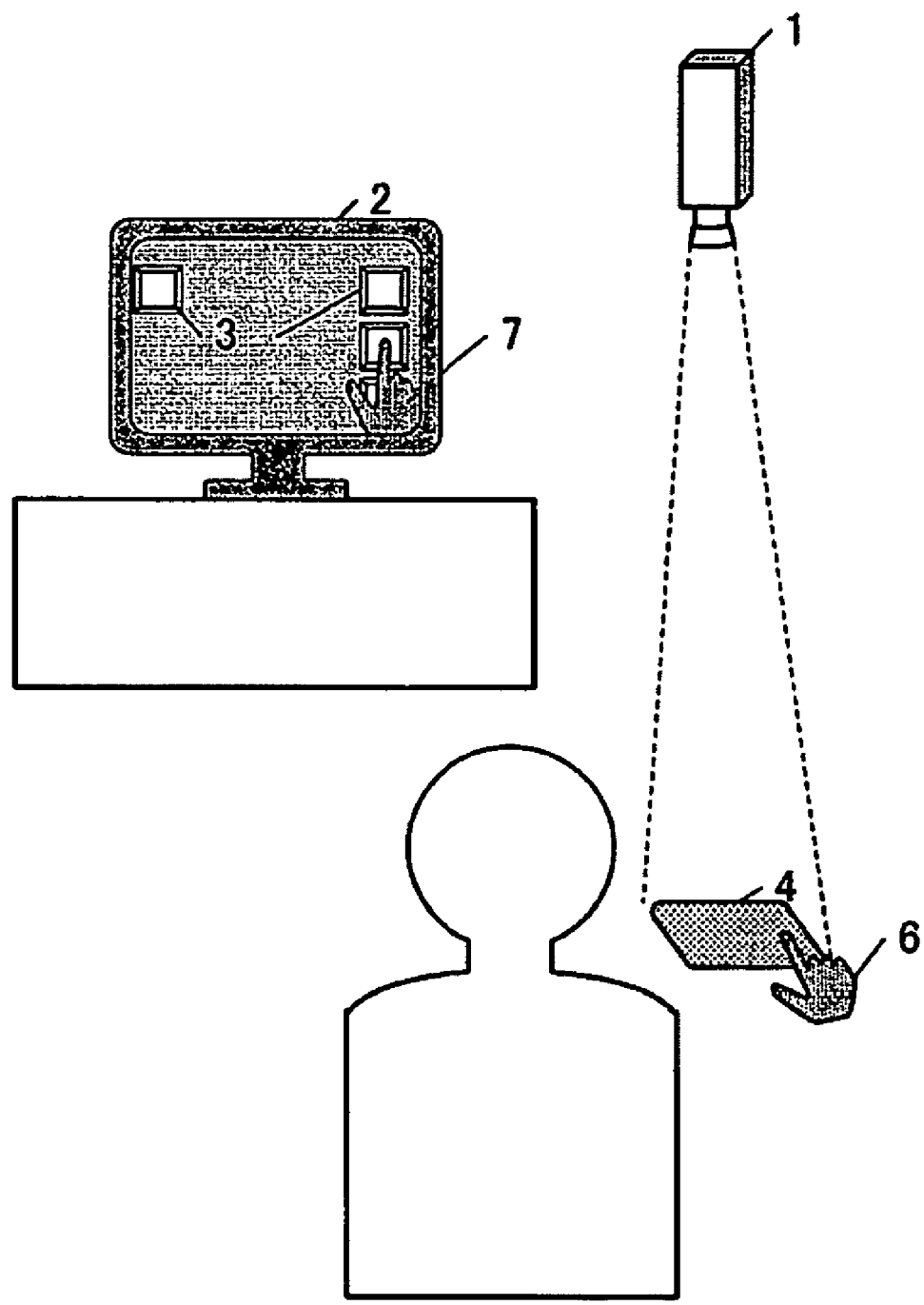
FIG. 1 is a schematic diagram showing an input device according to an embodiment of the present invention.

DESCRIPTION OF THE REFERENCE CHARACTERS 1 camera
2 display
3 GUI component
4 touchpad
6 hand
7 hand image
100 body shape input section
110 light source
120 mirror
130 casing
140 visible light cut filter
150 light receiving section
160 light emitting section
171 sensitivity range
200 display section
300 operation section
400 calculation section
500 control section
600 body shape extraction section
700 display information generation section
800 image composition section
1000 input device

BEST MODE FOR CARRYING OUT THE INVENTION

With reference to the drawings, an embodiment of the present invention will be described in detail below.

FIG. 1 is a schematic diagram showing an input device according to the embodiment of the present invention. Referring to FIG. 1, a touchpad 4 for an operation is installed at hand and a display 2 is installed remotely from the user. A camera 1 is installed above the touchpad 4. One or more GUI components 3 for the user to input a desired command and desired information are displayed on the display 2.

The points on an operation surface of the touchpad 4 correspond one-on-one to the points on a display screen of the display 2 such that when the user presses a certain point on the operation surface of the touchpad 4, coordinate data (absolute coordinate data) representing a contact position of the pressed point is outputted from the touchpad 4 to a control section, the GUI component 3 corresponding to the contact position is specified based on the outputted coordinate data, and a command and information which are associated with the specified GUI component 3 are inputted.

When the user moves a hand 6 onto the touchpad 4 to select the GUI components 3, the camera 1 captures the image of the hand 6, including the touchpad 4 in the background. The control section recognizes, by a pattern matching method, the shape and the gesture of the hand 6 from the image data outputted from the camera 1. Then, only the portion corresponding to the touchpad 4 is extracted and the image of the hand 6 which is included in the extracted portion is displayed on the display 2 as a hand image 7 by superimposition. That is, the whole captured image is used to detect the shape and the gesture of the hand 6, and only the portion corresponding to the touchpad 4 is used for display performed on the display 2.

While viewing the hand image 7 displayed on the display 2, the user moves the hand 6 to position a fingertip of the hand image 7 on a desired GUI component 3 and then presses the touchpad 4. As a result, the command and the information which are associated with the GUI component 3 (i.e., the GUI component 3 positioned at the fingertip of the hand image 7) corresponding to the contact position of the pressed touchpad 4 are inputted.

Further, in the input device of the present invention, since the hand image 7 is displayed on the display screen even when the user slightly distances his/her finger from the operation surface of the touchpad 4, the user can confirm the position on the display screen to which the current position of his/her finger corresponds, without actually causing his/her finger to contact the touchpad 4 and sliding his/her contacting finger. Thus, it is possible to perform a simple and quick input operation of merely pressing the touchpad 4 once.

Note that although, here, the touchpad 4 outputs the coordinate data, the touchpad 4, as described below, may not necessarily have a function of outputting the coordinate data of the contact position and may have a simple function of detecting only whether or not the user has pressed the touchpad 4. In this case, a fingertip position may be detected from the image captured by the camera 1, and thus it maybe determined, based on the detected fingertip position, which one of the GUI components 3 has been selected by the user.

The input device will be described in further detail below.

Figure 2:
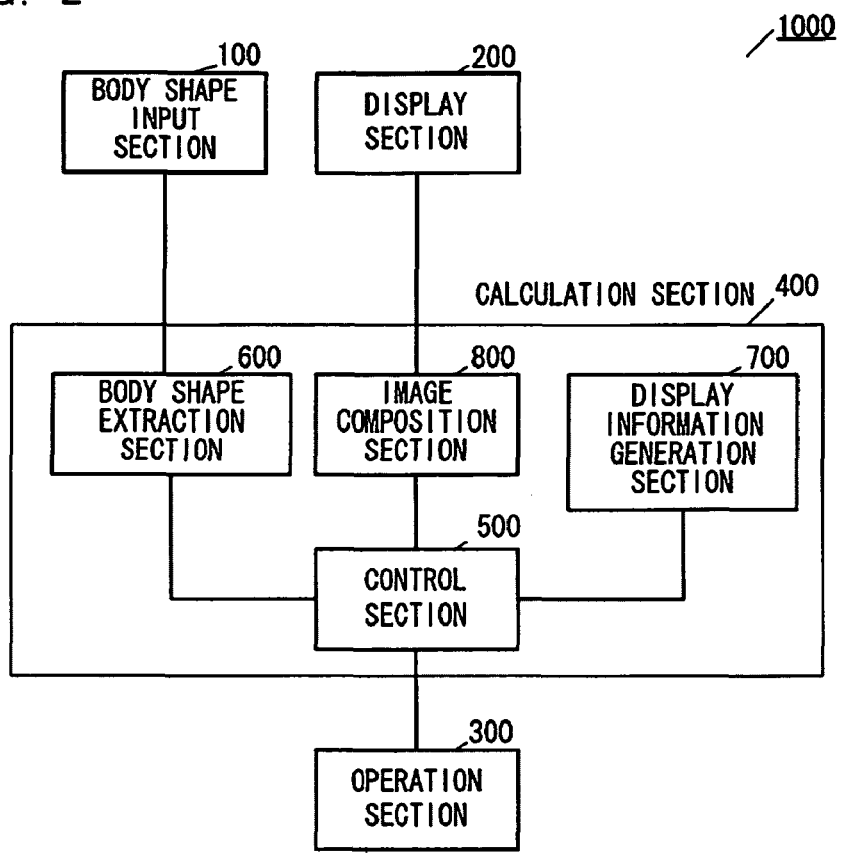
FIG. 2 is a block diagram showing the structure of the input device.

FIG. 2 is a block diagram showing the structure of the input device. Referring to FIG. 2, an input device 1000 includes a body shape input section 100, a display section 200, an operation section 300, and a calculation section 400. The calculation section 400 includes a control section 500 for controlling the whole calculation section 400, a body shape extraction section 600 for extracting a body shape by processing an output from the body shape input section 100, a display information generation section 700 for generating display information (i.e., an image including the GUI components 3) which is necessary for the user to input a command and information, an image composition section 800 for making a composite image of an image representing a body portion of the user who operates the operation section 300 and the display information generated by the display information generation section 700. The structure of each element will be described in detail below.

Body Shape Input Section 100

First, the body shape input section 100 will be described. The body shape input section 100 is means for inputting to the device the shape and the position of the body portion such as a hand used by the user for an operation. With reference to FIGS. 3 through 11, examples of using a camera as the body shape input section 100 will be described.

As the body shape input section 100, for example, a visible-light camera, a near-infrared camera, an infrared camera, and/or an ultrasonic camera may be used. The body shape input section 100 is positioned so as to capture the operation section 300, captures the operation section 300, and outputs the image data of the captured operation section 300. When the user is operating the operation section 300 by the hand 6, the image captured by the body shape input section 100 includes the hand 6. It is preferable that the body shape input section 100 is positioned on a normal line passing through the middle of the operation surface of the operation section 300 and also is installed such that the optical axis of the lens of the body shape input section 100 is parallel to the normal line.

When the body shape input section 100 is a visible-light camera, it is preferable that a light source 110 for emitting visible light is provided so as to clearly capture the hand 6 even at night, and that the operation surface of the operation section 300 is in a uniform color, particularly black or blue, so as to easily extract the hand shape from the image data outputted from the body shape input section 100.

When the body shape input section 100 is a near-infrared camera, it is preferable that the light source 110 for emitting near-infrared light is provided so as to always clearly capture the hand 6, and that the operation surface of the operation section 300 is black.

Further, also to easily extract the hand shape from the image data outputted from the body shape input section 100, it is preferable to prevent sunlight, headlights of a car, streetlights, and the like from directly illuminating the operation section 300 or the hand 6 performing an operation.

Figure 3:
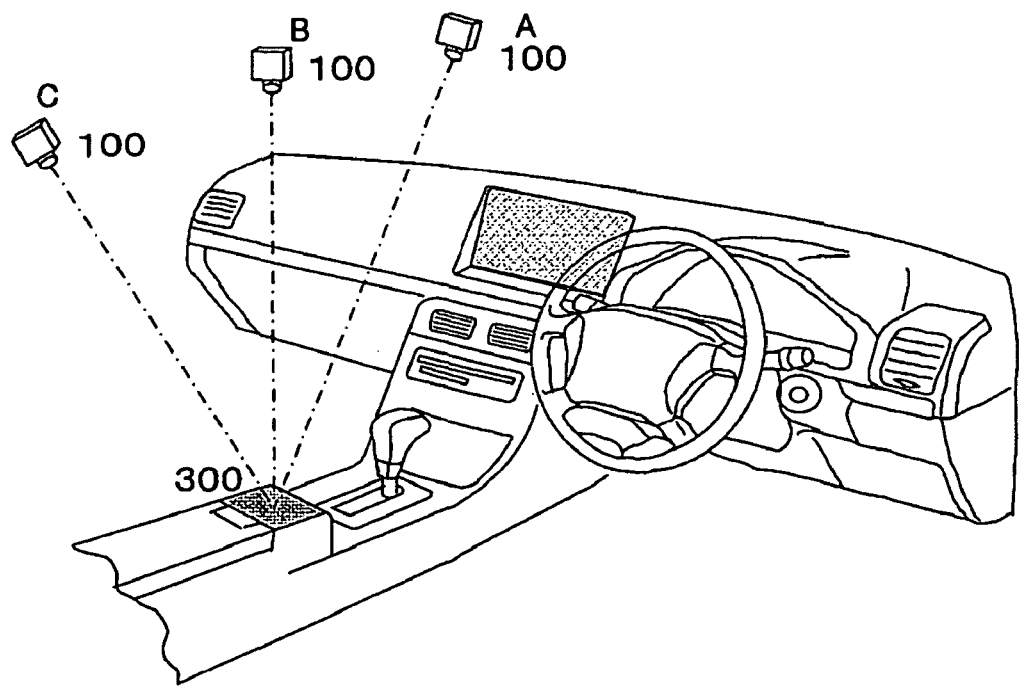
FIG. 3 shows an in-vehicle installation example of the input device.

With reference to FIGS. 3 through 6, in-vehicle installation examples will be described. FIG. 3 shows a first installation example. In the first installation example, the operation section 300 is an extension of a center console and is installed at the position for allowing the driver to operate the operation section 300 with his/her elbow placed on an armrest. The body shape input section 100 is installed at the position for capturing the operation section 300. Although it is preferable that the body shape input section 100 is installed at a position B (the ceiling of the vehicle, etc.) which is on the normal line of the operation section 300, the body shape input section 100 may be incorporated in a map light or in a rearview mirror, each positioned anterior (at a position A) to the position B. Alternatively, the body shape input section 100 maybe incorporated in a room light unit positioned posterior (at a position C) to the position B.

Note that as at the position A and the position C of FIG. 3, when the body shape input section 100 is installed in an oblique direction (i.e., a direction different from a vertical direction) to the operation surface of the operation section 300, the shape of the hand 6 which is captured by the body shape input section 100 may be different from the shape of the hand 6 when viewed from the vertical direction to the operation surface, and therefore the below-described view point conversion process (image processing for converting the image viewed from the oblique direction to the operation surface into the image viewed from the vertical direction to the operation surface) may be required when the hand image 7 is generated.

Figure 4:
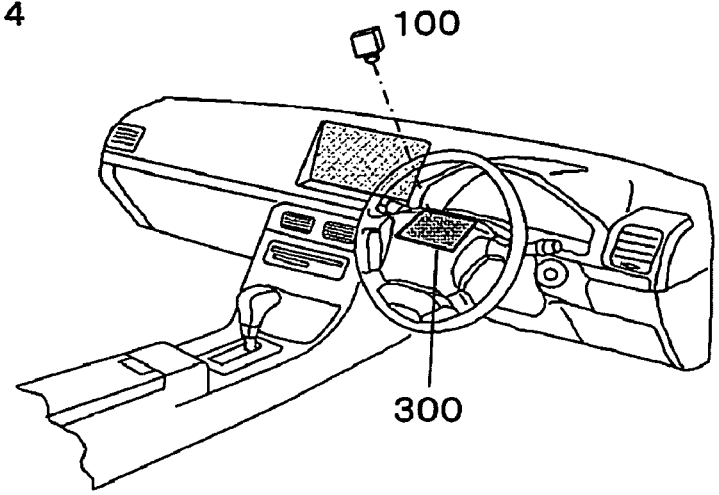
FIG. 4 shows an in-vehicle installation example of the input device.

FIG. 4 shows a second installation example. In the second installation example, the operation section 300 is installed, facing obliquely upwards, in the central part of the steering wheel. The body shape input section 100 is installed at the position (the ceiling of the vehicle, etc.) for capturing the operation section 300. Although in this case, the image captured by the body shape input section 100 rotates in accordance with the steering angle of the steering wheel, it is possible to remove the effect of the rotation by correcting the image data outputted from the body shape input section 100. A method of correcting the image data may include, as an example, that of providing means for detecting the steering angle of the steering wheel and of performing a rotation process on the image data in accordance with the detected steering angle. Alternatively, as another example, a method of putting one or more reference markers on the operation surface of the operation section 300, detecting the steering angle of the steering wheel by detecting the positions of the reference markers based on the image data, and performing a rotation process on the image data in accordance with the detected steering angle maybe possible.

Figure 5:
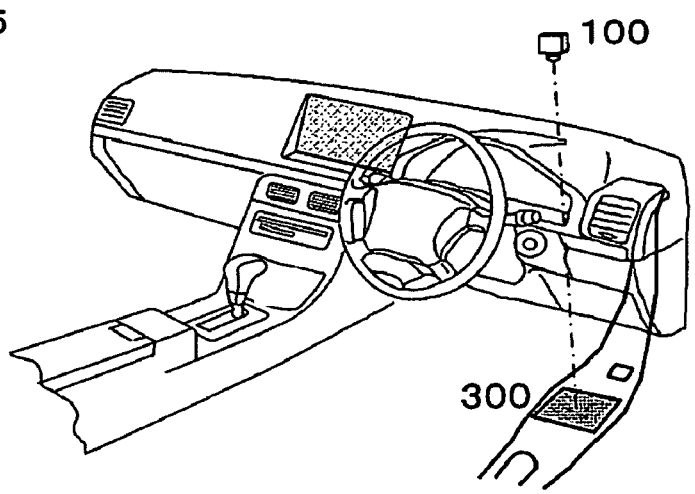
FIG. 5 shows an in-vehicle installation example of the input device.

FIG. 5 shows a third installation example. In the third installation example, the operation section 300 is installed at the position which is inside the door of the driver's seat and which allows the driver to operate the operation section 300 with his/her elbow placed on an armrest. The body shape input section 100 is installed at the position (the ceiling of the vehicle, etc.) for capturing the operation section 300.

Figure 6:
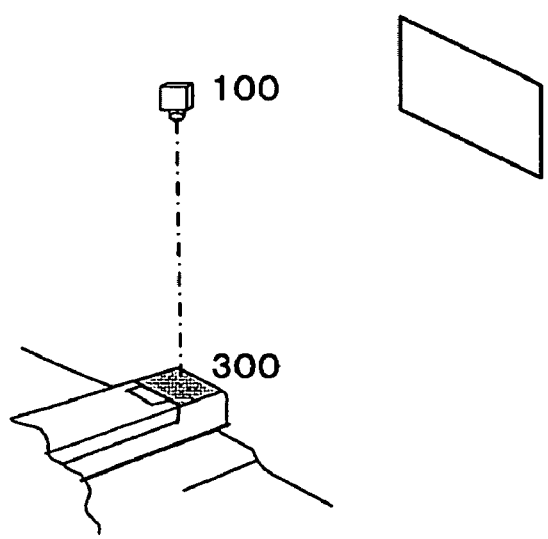
FIG. 6 shows an in-vehicle installation example of the input device.

FIG. 6 shows a fourth installation example. In the fourth installation example, the operation section 300 is installed on an armrest provided in the middle of the back seat. The body shape input section 100 is installed at the position (the ceiling or the room light of the vehicle) for capturing the operation section 300.

Figure 7:
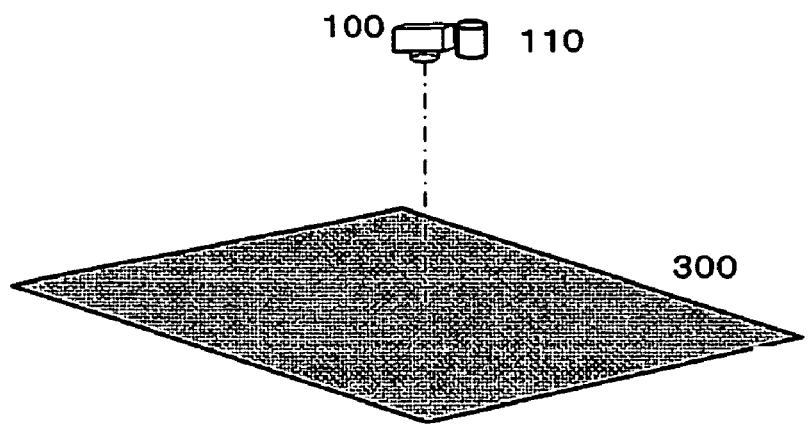
FIG. 7 shows an installation example of a body shape input section 100.
Figure 8:
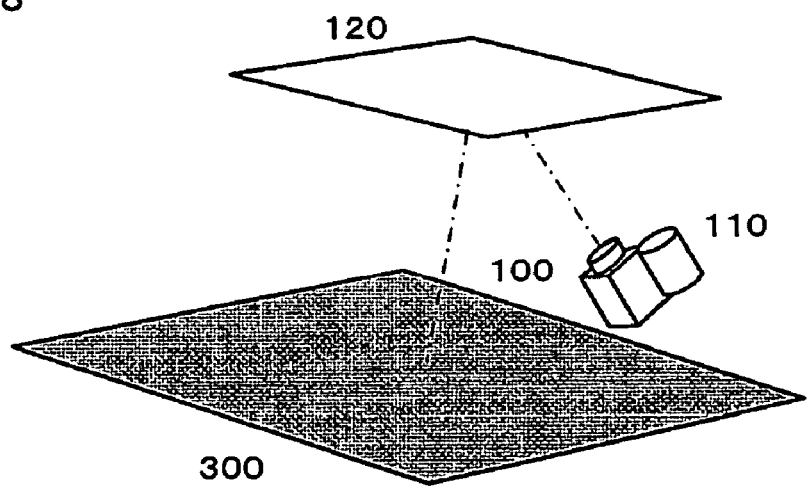
FIG. 8 shows an installation example of the body shape input section 100.
Figure 9:
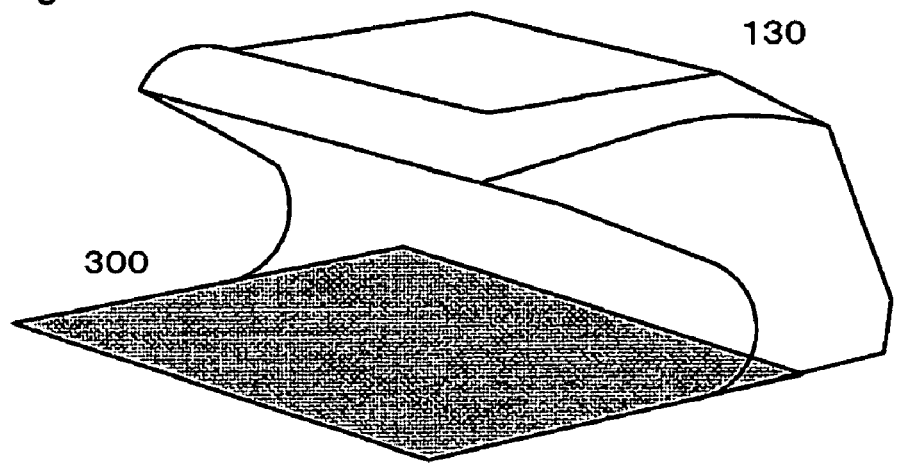
FIG. 9 shows an example where the body shape input section 100 and an operation section 300 are provided in an integrated manner.

Although in the examples of FIGS. 3 through 6, the body shape input section 100 is installed remotely from the operation section 300, such as at the ceiling of the vehicle, it is also possible to provide the body shape input section 100 and the operation section 300 in an integrated manner. With reference to FIGS. 7 through 9, examples of providing the body shape input section 100 and the operation section 300 in an integrated manner will be described below.

FIG. 7 shows an example where the body shape input section 100 is installed at a predetermined position above the operation section 300. The light source 110 maybe installed near the body shape input section 100 as necessary. When the body shape input section 100 is intended to generate a colored image, the light source 110 is required to be a visible light source. However, when the body shape input section 100 is intended to generate a monochrome image, the light source 110 maybe a near-infrared light source.

FIG. 8 shows an example where a mirror 120 is installed at a predetermined position above the operation section 300 such that the body shape input section 100 captures the reflections of the operation section 300 and the hand 6 in the mirror 120.

To realize the structures of FIGS. 7 and 8, the relative position of the body shape input section 100 to the operation section 300 may be fixed by using, for example, a casing 130 as shown in FIG. 9.

As described above, the body shape input section 100 and the operation section 300 may be provided in an integrated manner, whereby it is possible to easily adjust the optical axis of the body shape input section 100. Further, the operation section 300 may be shielded by the casing 130 as shown in FIG. 9, whereby it is difficult for external light (sunlight, etc.) to illuminate the operation section 300.

Figure 10:
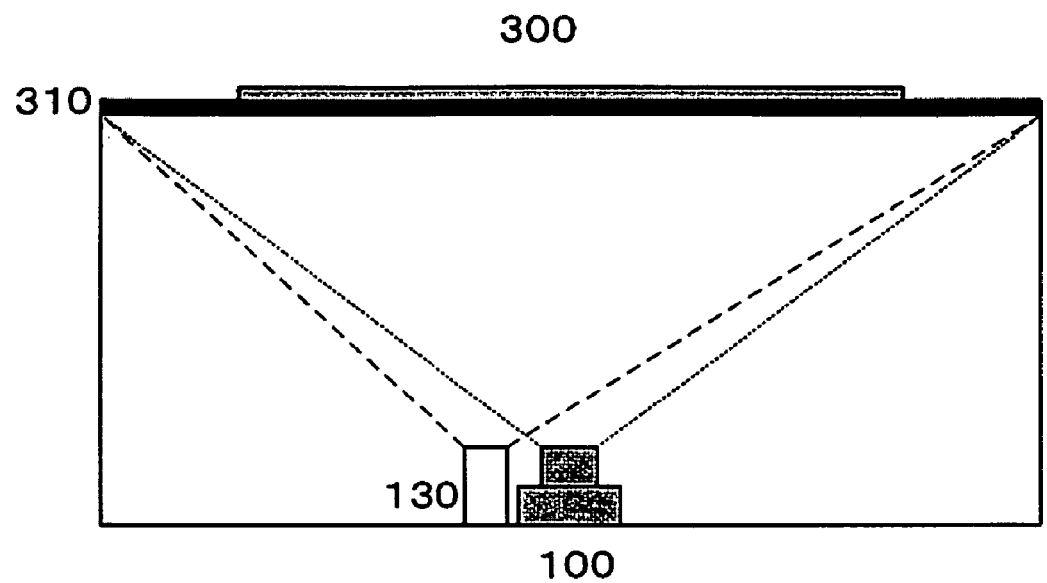
FIG. 10 is a side elevation view showing an example where the body shape input section 100 is installed below the operation section 300.
Figure 11:
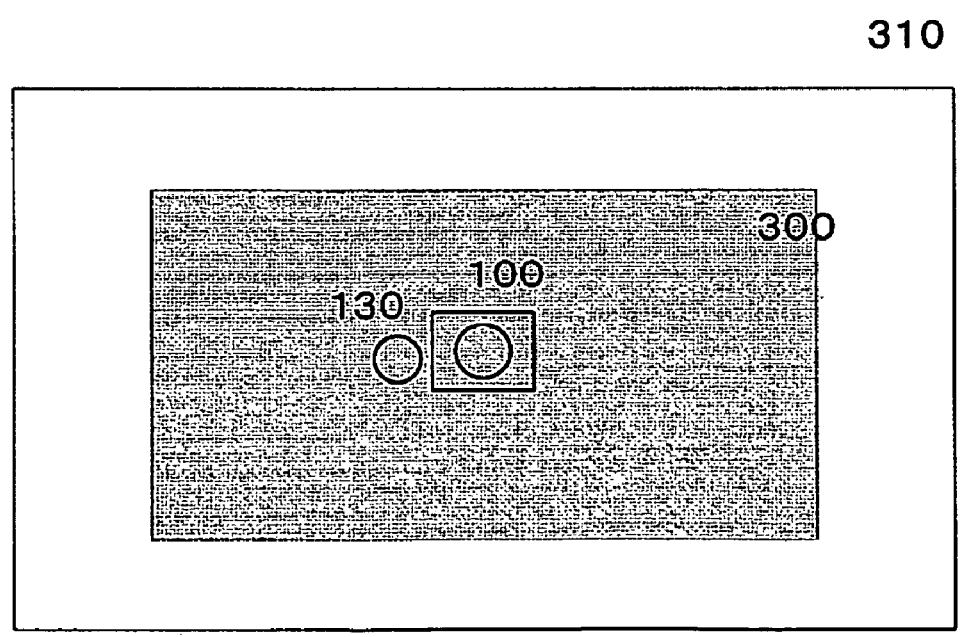
FIG. 11 is a bird's-eye view showing the example where the body shape input section 100 is installed below the operation section 300.

Although in FIGS. 3 through 9, the operation section 300 and the hand 6 are captured from above (i.e., the operation surface side of the operation section 300) by the body shape input section 100, it is also possible that the operation section 300 and the hand 6 are captured from below (i.e., the opposite side of the operation surface of the operation section 300) by the body shape input section 100. With reference to FIGS. 10 and 11, an example structure where the body shape input section 100 captures the operation section 300 from below will be described below.

FIG. 10 shows an example where a transparent touch panel is used as the operation section 300, and the body shape input section 100 and the light source 110 are installed therebelow. FIG. 11 is a bird's-eye view of the operation section 300 of FIG. 10. In this example, a visible light cut filter 140 is positioned below the underside surface of the touch panel in a layered manner. Further, the light source 110 is intended to emit near-infrared light, and the body shape input section 100 is a capture device having the sensitivity to near-infrared light.

Body Shape Extraction Section 600

Next, the body shape extraction section 600 will be described. The body shape extraction section 600 extracts body shape data based on an output from the body shape input section 100. The body shape data is data representing, for example, the shape and the position of a body portion (i.e., a hand, a foot, etc.) which the user places on (but may distance from) the operation surface of the operation section 300.

Figure 12:
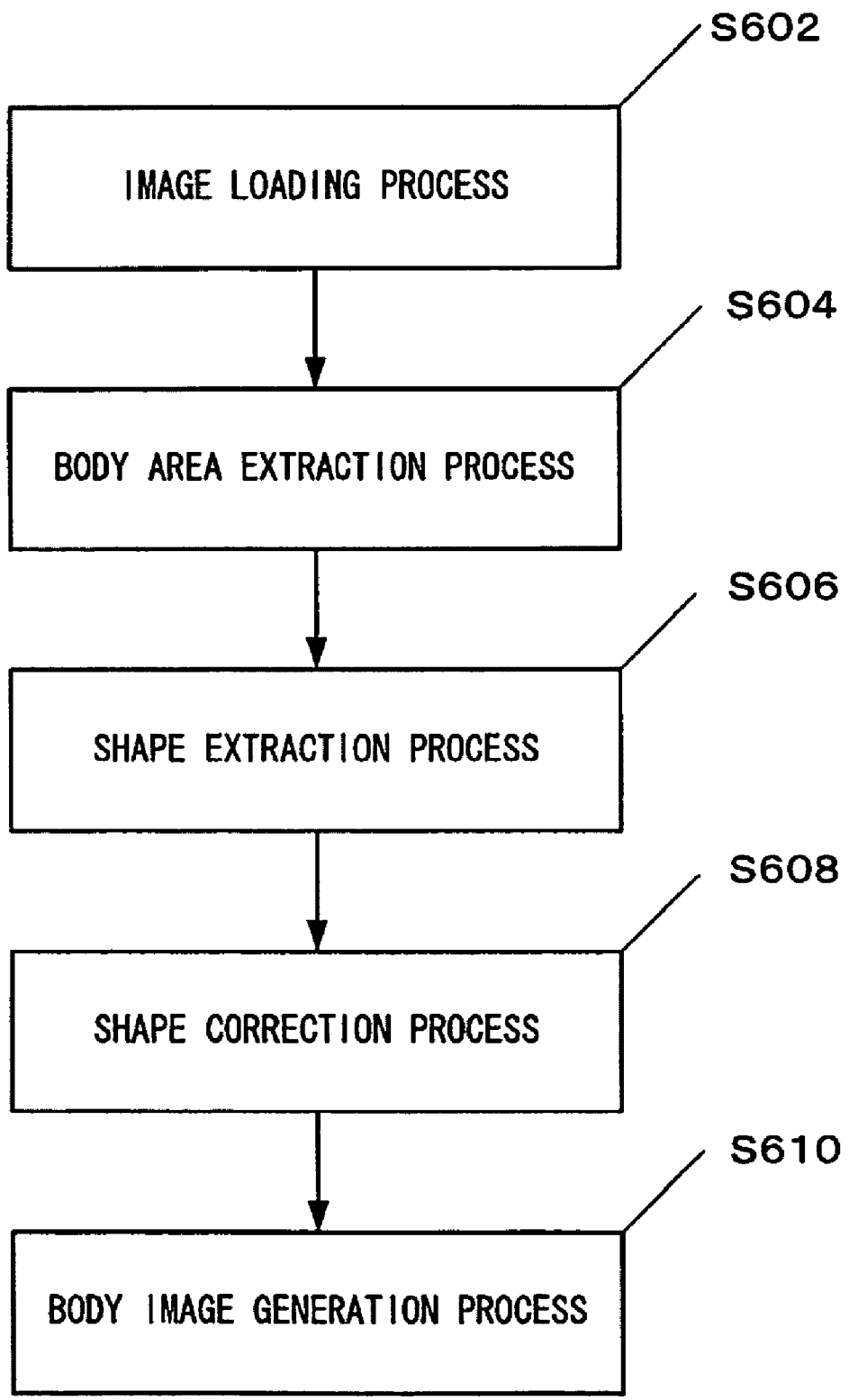
FIG. 12 is a flow chart showing the flow of the process performed by a body shape extraction section 600.

FIG. 12 is a flow chart showing the flow of a body shape extraction process performed by the body shape extraction section 600.

Figure 13:
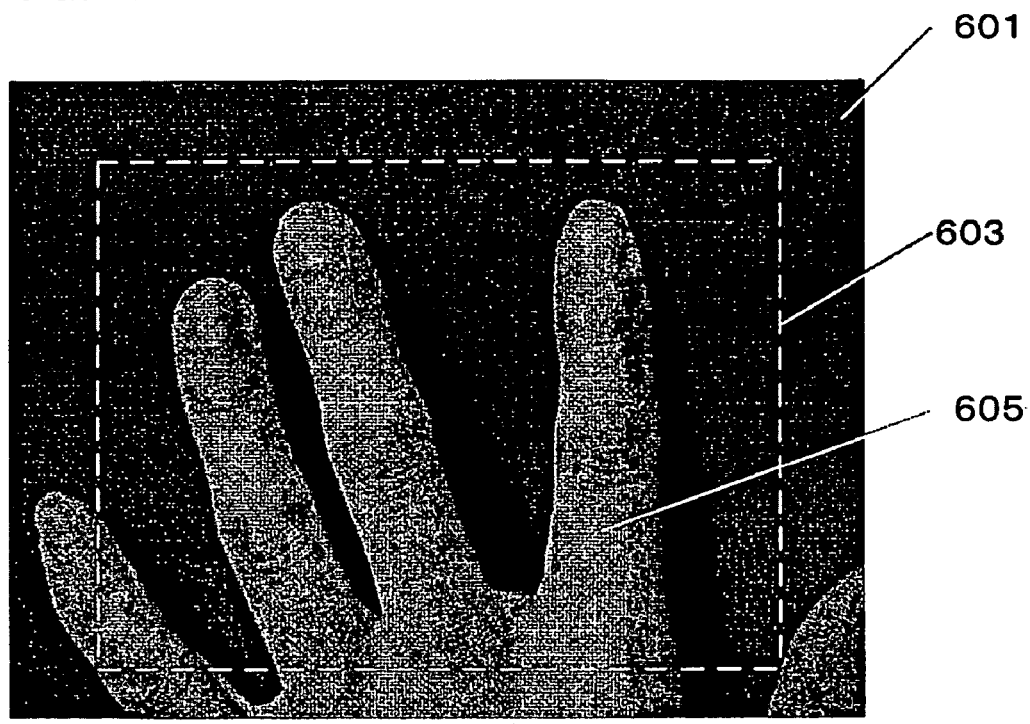
FIG. 13 shows an example of image data processed by the body shape extraction section 600.

First, the body shape extraction section 600 loads the image data outputted from the body shape input section 100 (the camera in this case) into a frame memory (step S602). FIG. 13 shows an example of the image data loaded in the frame memory. In image data 601 of FIG. 13, 603 corresponds to the operation surface of the operation section 300 and 605 corresponds to the hand 6 of the user.

Figure 14:
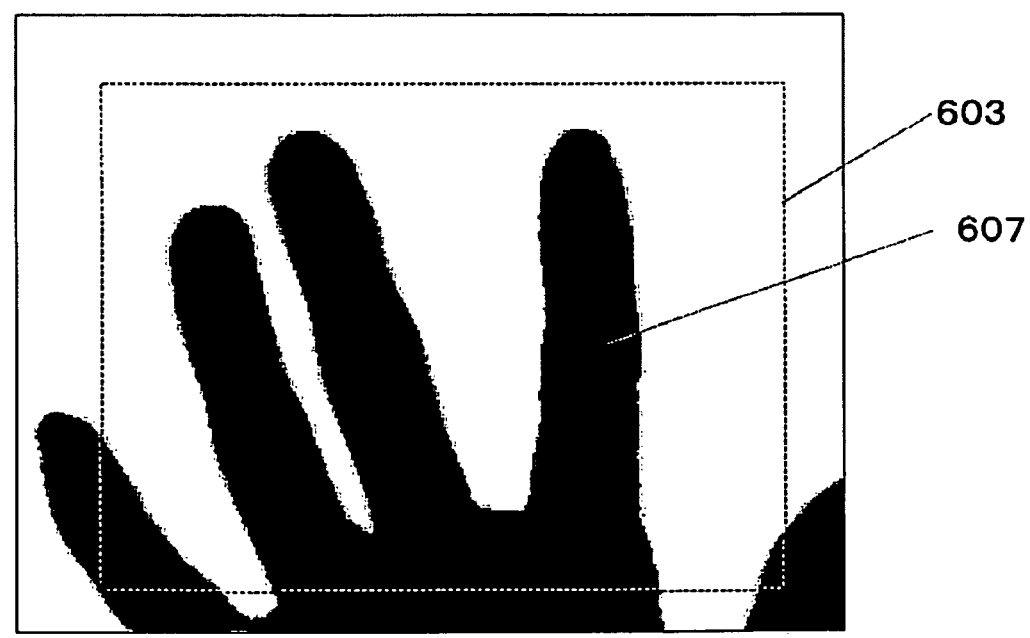
FIG. 14 shows an example of a body area 607 extracted by the body shape extraction section 600.

Next, as shown in FIG. 14, the body shape extraction section 600 extracts, as a body area 607, an area corresponding to the body (the hand 6 in this case) of the user from the image data loaded into the frame memory in step S602 (step S604). A possible method of extracting the body area from the image data may include, for example, the following methods.

A first extraction method is a background difference method. In the background difference method, first, the body shape input section 100 captures the operation section 300 in the state where nothing exists between the body shape input section 100 and the operation section 300, and the capture result is stored as background image data. Then, the image data and the background image data which are outputted from the body shape input section 100 are compared to each other on a pixel-by-pixel basis or on a block-by-block basis, and the different portion therebetween is extracted as the body area. The background difference method has the advantage that the operation surface of the operation section 300 is not required to be in a single color. Note that the background image data may be stored in memory in advance, or that when the image data outputted from the body shape input section 100 does not change for more than a certain period of time, the outputted image data may be stored as the background image data.

A second extraction method is a brightness threshold method. In the brightness threshold method, the body area is extracted by comparing the brightness value of each pixel of the image data outputted from the body shape input section 100 to a predetermined threshold. Accordingly, it is preferable that in the image data outputted from the body shape input section 100, the operation surface of the operation section 300 is black or a color close to black and also the operation surface is matte so as to eliminate the reflection of light as much as possible, such that the brightness difference between the portion corresponding to the hand 6 and the portion corresponding to the operation surface of the operation section 300 is large. The threshold is set to be a value greater than the brightness value of any pixel which is included in the image data outputted from the body shape input section 100 and which corresponds to the operation section 300. It is possible to extract the body area by extracting an area having the brightness values greater than the threshold set as described above. Note that to stably extract the body area even in the dark such as at night, the body area is required to appear having the brightness values greater than the threshold by, for example, shining visible light or near-infrared light into the range of the angle of view of the body shape input section 100.

However, not only is the body portion of the user necessarily placed on the operation surface of the operation section 300, but also, for example, baggage may be placed thereon. In this case, since the baggage is recognized as the body portion, the image of the baggage is displayed on the display section 200 and prevents the display information from being displayed. In response, it is possible to avoid the above problem by determining whether or not the shape extracted in step S606 is the shape of the body portion and thus not performing a subsequent process when the extracted shape is not that of the body portion. To determine whether or not the shape extracted in step S606 is the shape of the body portion, it is only necessary to retain the shape patterns of the body portion in advance and compare (pattern-match) the shape extracted in step S606 to the retained shape patterns. Note that the control section 500 maybe notified of the pattern matching result, whereby an input operation performed on the operation section 300 may be validated only when the shape extracted in step S606 is shown to be the shape of the body portion. Consequently, it is possible to prevent a malfunction from occurring due to baggage and the like placed on the operation surface of the operation section 300.

Incidentally, for example, when the user has his/her nails painted with a manicure of the same color as that of the operation surface of the operation section 300, the hand shape lacking the nail portion is extracted in step S606. However, the above-described shape patterns may be prepared, whereby it is possible, with reference to the prepared shape patterns, to compensate for the portion partially missing in the detected shape of the body portion.

Figure 15:
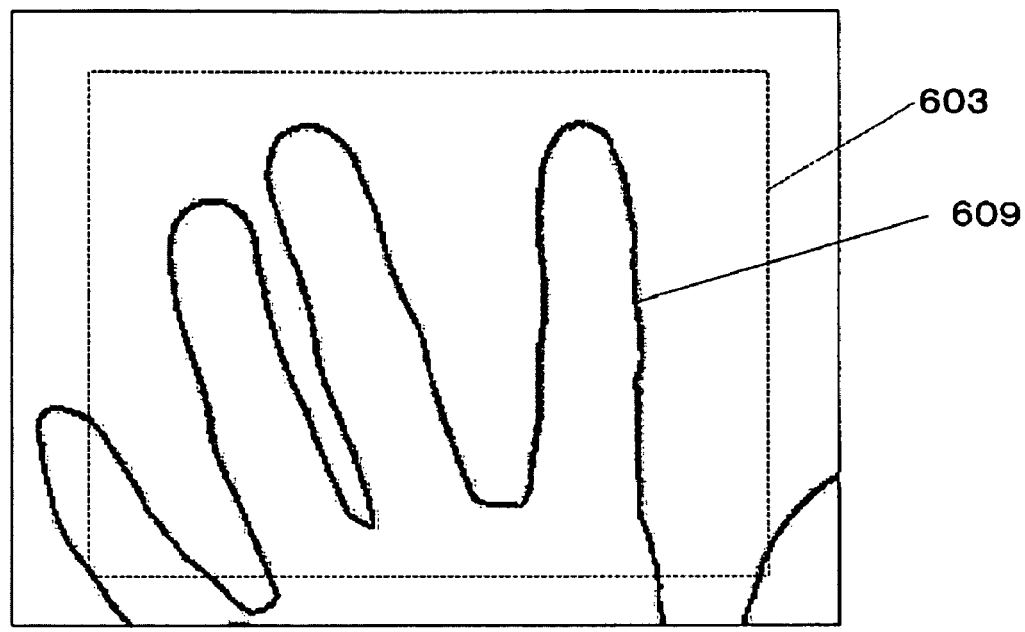
FIG. 15 shows an example of a contour 609 extracted by the body shape extraction section 600.

When the extraction of the body area is completed, next, the body shape extraction section 600 extracts, based on the body area 607 extracted in step S604, a contour 609 of the extracted body area 607 as shown in FIG. 15 (step S606). This contour extraction process is performed by extracting, from the pixels included in the body area 607, pixels adjacent to the pixels of an area other than the body area 607. More specifically, from all of the pixels included in the body area 607, pixels each having four adjacent pixels above and below, to the left and right (or eight adjacent pixels further including the diagonally upper-right, diagonally upper-left, diagonally lower-right and diagonally lower-left pixels of the attention pixel) which include a pixel of an area other than the body area 607, are extracted. Note that a smoothing process may be performed on the extracted contour 609 as necessary. It is possible, by performing the smoothing process, to eliminate aliasing occurring in the contour 609.

Next, the body shape extraction section 600 performs a shape correction process (step S608). In the shape correction process, from the image data of a capture range and the contour 609 of the body shape which are outputted from the body shape input section 100, only an area related to an operation range is extracted. Then, a camera lens distortion correction process, a viewpoint conversion process, and other correction processes are performed on the extracted image data and the extracted contour 609.

The operation range included in the capture range is determined based on the installation method of the body shape input section 100 and the operation section 300. A method of acquiring the operation range may be, for example, that of placing markers on the four corners or the like of the operation section 300 in advance (i.e., in the state where the body portion is not displayed in the capture range), determining the markers by the brightness threshold method, and storing the positions of the markers. In an actual operation, an extraction is completed by removing the areas other than the operation range in accordance with the stored operation range.

The camera lens distortion correction process is performed, particularly when the body shape input section 100 uses a wide-angle lens, by using distortion data of the lens. Consequently, when the body shape input section 100 uses a lens (e.g., a standard lens, a telephoto lens) having small distortion, the camera lens distortion correction is not necessary.

Figure 16:
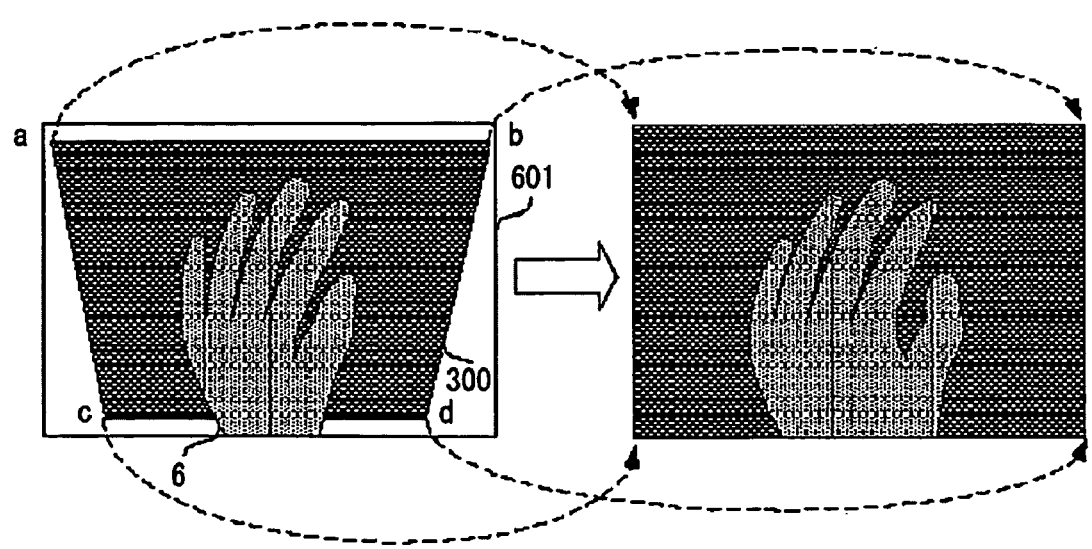
FIG. 16 is a diagram showing an example of a shape correction process.
Figure 17:
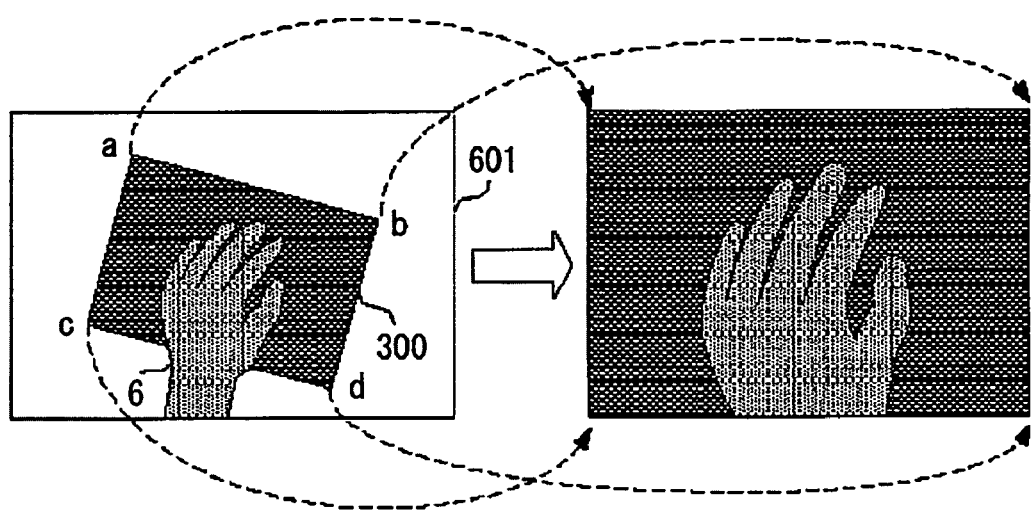
FIG. 17 is a diagram showing an example of the shape correction process.

The viewpoint conversion process is performed when the body shape input section 100 cannot be installed to have a desired viewpoint (a viewpoint from straight above the operation section 300 in the present embodiment) due to an installation location constraint and the like. A viewpoint conversion method is a well-known method. With reference to FIGS. 16 and 17, examples of the viewpoint conversion process will be described.

FIG. 16 shows an example of the viewpoint conversion process applied when the body shape input section 100 is installed at a position such as the position A of FIG. 3. The image is expanded such that the four corners (a, b, c, d) of the operation section 300 included in the image data 601 outputted from the body shape input section 100 are positioned to correspond to the four corners of the display screen of the display section 200. In this case, when the relative positions of the body shape input section 100 and the operation section 300 to each other are fixed, the positions of the four corners (a, b, c, d) of the operation section 300 included in the image data 601 are also fixed, and thus it is possible to perform the view point conversion process as shown in FIG. 16 without detecting the positions of the four corners in each case. However, when the relative positions of the body shape input section 100 and the operation section 300 to each other are not fixed, it is required to detect the positions of the four corners of the operation section 300 based on the image data 601 outputted from the body shape input section 100. In this case, it is possible to detect the positions of the four corners more accurately by putting certain markers on the four corners of the operation section 300. Note that it is also possible to cause an arbitrary area included within the operation surface of the operation section 300 to correspond to the display screen of the display section 200. Also in this case, reference markers may be put on the four corners of the arbitrary area, whereby it is possible to expand the image such that the four corners are positioned to correspond to the four corners of the display screen of the display section 200.

FIG. 17 shows an example of the viewpoint conversion process applied when the body shape input section 100 is installed at the position shown in FIG. 4. In the example of FIG. 4, since the operation section 300 rotates with the steering wheel, the operation section 300 included in the image data 601 outputted from the body shape input section 100 also rotates with the rotation of the steering wheel. Also in this case, the four corners (a, b, c, d) of the operation section 300 included in the image data 601 outputted from the body shape input section 100 are detected, and then the image is expended such that the detected four corners are positioned to correspond to the four corners of the display screen of the display section 200.

Note that in step S608, the shape correction process other than the camera lens distortion correction process and the viewpoint conversion process is performed as necessary. For example, a process of converting the resolution and the aspect ratio of the image data outputted from the body shape input section 100 into the resolution and the aspect ratio, respectively, of the display screen of the display section 200, is appropriately performed.

Figure 18:
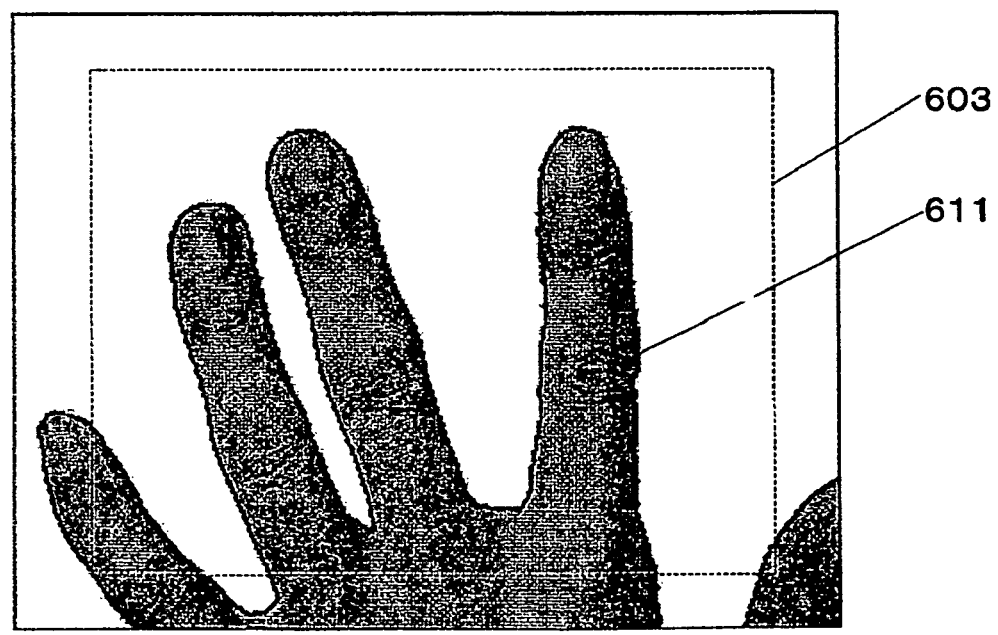
FIG. 18 shows an example of a body image generated by the body shape extraction section 600.

Note that in the present embodiment, it is assumed that the body shape input section 100 uses a standard lens which does not require the lens distortion correction, that the body shape input section 100 is positioned on the normal line passing through the middle of the operation surface of the operation section 300 and is installed such that the optical axis of the body shape input section 100 is parallel to the normal line, and that the angle of view of the body shape input section 100 is set such that the whole operation surface of the operation section 300 fits exactly within the image. In this case, the shape correction process of step S608 is not necessary. As a result of the shape correction process of step S608, a hand image 611 as shown in FIG. 18 is obtained.

Next, the body shape extraction section 600 performs a body image generation process (step S610). This step is a step of generating a body image to be displayed on the display section 200. When a body image (e.g., the hand image 611 of FIG. 18) generated in step S608 is displayed, without being changed, on the display section 200, it is not particularly required to perform any process in this step. Here, processes to be performed are: that of, when the body image generated in step S608 is dark, increasing the brightness of the body image; that of performing the smoothing process on the body image so as to make fine wrinkles of the hand less noticeable; that of correcting the color tone of the body image so as to display the hand more clearly; and that of mapping a prepared texture image onto the inside area of the contour. The texture may include, for example, those of animal hide, wood, concrete, metal, and an artificial pattern.

Display Section 200

Next, the display section 200 will be described. The display section 200 displays on the display screen the composite image made by the image composition section 800. As the display section 200, a liquid crystal display, a CRT (Cathode Ray Tube) display, an EL (Electronic Luminescence) display, and the like can be used.

Note that the display section 200 may be, for example, a display such as an HUD (Head Up Display) or an HMD (Head Mounted Display), each of which forms in the air the composite image made by the image composition section 800, by using a one-way mirror, a mirror, a lens, and the like. In this case, it is possible to display the image even at a position such as above the front hood of the vehicle, at which it is difficult to install the display section 200.

Further, as the display section 200, a projector may be used. In this case, the composite image made by the image composition section 800 is cast onto the display screen by the projector, and thus it is possible to perform image magnification inexpensively.

As described above, the structure of the display section 200 may be appropriately selected in accordance with the installation location, the display purpose, and the like.

Operation Section 300

Next, the operation section 300 will be described. The operation section 300 senses the input operation performed by the user and outputs a signal corresponding to the sensed input operation. As the operation section 300, for example, a coordinate input device such as a touch panel or a touchpad, and switches (switches used as hardware) including button switches and a jog dial can be used. Needless to say, the operation section 300 may include both the coordinate input device and the switches. An example of using the coordinate input device as the operation section 300 and an example of using the switches as the operation section 300 will be described separately below.

First, with reference to FIG. 19, the example of using the coordinate input device as the operation section 300 will be described.

Referring to FIG. 19, the operation section 300 is the coordinate input device such as a touchpad or a touch panel, and outputs, at a predetermined timing, the coordinate data representing the position contacted (or pressed) by the user.

Here, the input operation performed by the user and sensed by the operation section 300 may generally include operations, performed by the user, of contacting the operation surface of the operation section 300 and of pressing the operation surface, but depends also on the type and the setting of the coordinate input device. For example, an electrostatic capacitance type touchpad generally senses whether or not the user has contacted the operation surface. In contrast, a pressure-sensitive touchpad senses not whether or not the user has contacted the operation surface, but whether or not the user has pressed the operation surface at more than a certain pressure. If the threshold of the pressure is increased, it is also possible to sense the input operation only when the user has pressed the operation surface firmly. Note that as well as the operation of contacting the operation surface and the operation of pressing the operation surface, the input operation performed by the user may include a variety of possible input operations such as a double-click (contacting or pressing the operation surface twice at a short interval), a drag (moving a finger contacting the operation surface), a long press (contacting or pressing the operation surface for more than a certain period of time), moving a finger closer to the operation surface, and moving a finger away from the operation surface. These input operations may not necessarily be sensed only by the operation section 300, and for example, the input operations such as the double-click and the drag may be sensed by the control section 500 based on the coordinate data outputted from the operation section 300.

Further, as shown in FIG. 19, a rotary switch for volume control may be displayed on the display section 200 by the GUI components in a simulated manner such that when a drag operation of drawing a circle on the operation surface of the operation section 300 is sensed, the volume may change in accordance with the drag operation. Consequently, it is possible to perform an intuitive input operation as if actually rotating a rotary switch.

As described above, the coordinate input device may be used as the operation section 300, whereby it is always possible to arbitrarily change the shapes, the positions, the functions, and the number of the GUI components displayed on the display section 200, as necessary. Further, for example, it is also possible to easily specify an arbitrary point on a map displayed on the display section 200. Thus, it is possible to provide a highly versatile input device.

Figure 20:
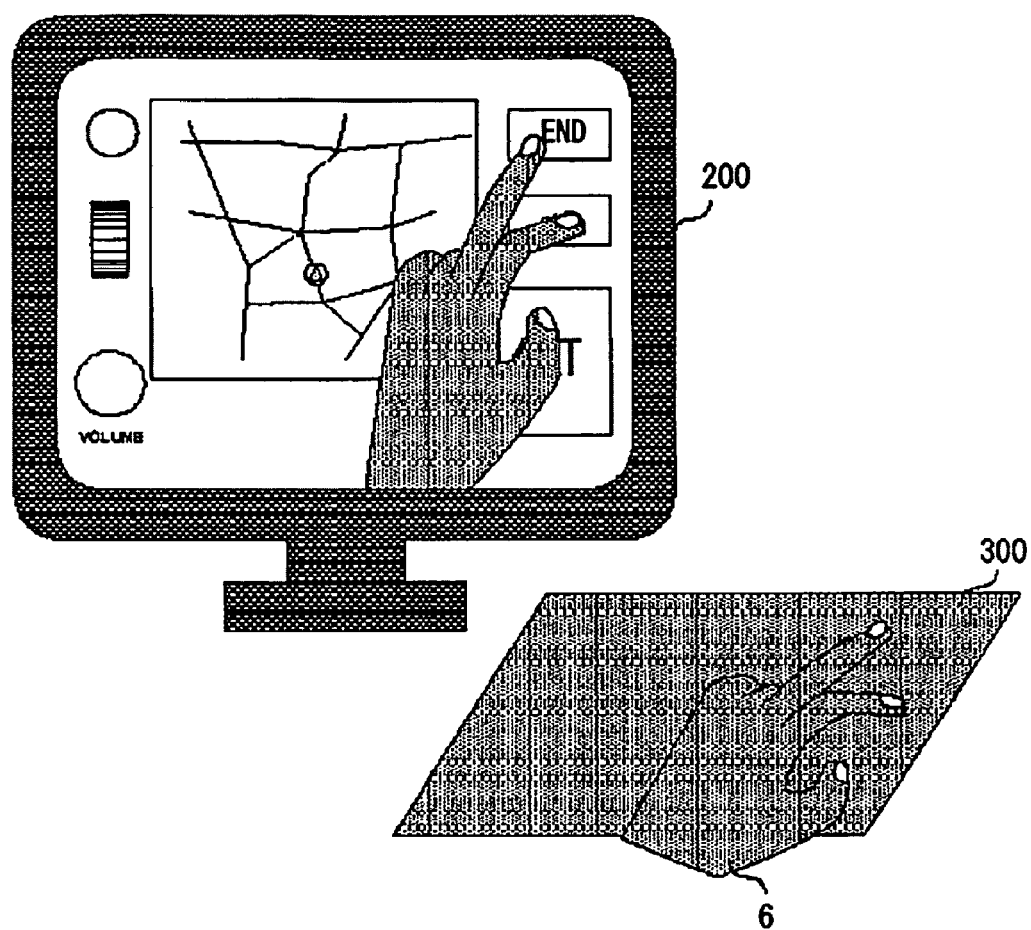
FIG. 20 shows an example of an operation method performed by a user.

As described above, the operation section 300 may not necessarily include a function of outputting the coordinate data, as those included in a general touchpad and a general touch panel. That is, the operation section 300 may include a function of outputting, as a signal, only the result of whether or not the user has contacted or pressed the operation surface. In this case, it is impossible to detect, based on the output from the operation section 300, the position contacted (or pressed) by the user, and therefore it is required to detect the contacted or pressed position based on the data outputted from the body shape input section 100. For example, a constraint may be imposed on the user such that the GUI components are selected with an index finger held up as shown in FIG. 1, whereby the fingertip of the index finger is detected based on the hand image obtained by the body shape extraction section 600, and thus it is possible to recognize which one of the GUI components has been selected by the user. Note, however, that if any constraint is not imposed as described above, it is difficult, based on the data outputted from the body shape input section 100, to accurately determine the position pressed by the user. However, if the operation section 300 includes a function of outputting the coordinate data, it is also possible that, for example, a plurality of fingers are remained positioned separately on a plurality of the GUI components in advance as shown in FIG. 20 and then a desired GUI component is appropriately selected from the plurality of the GUI components without moving the hand 6.

Figure 21:
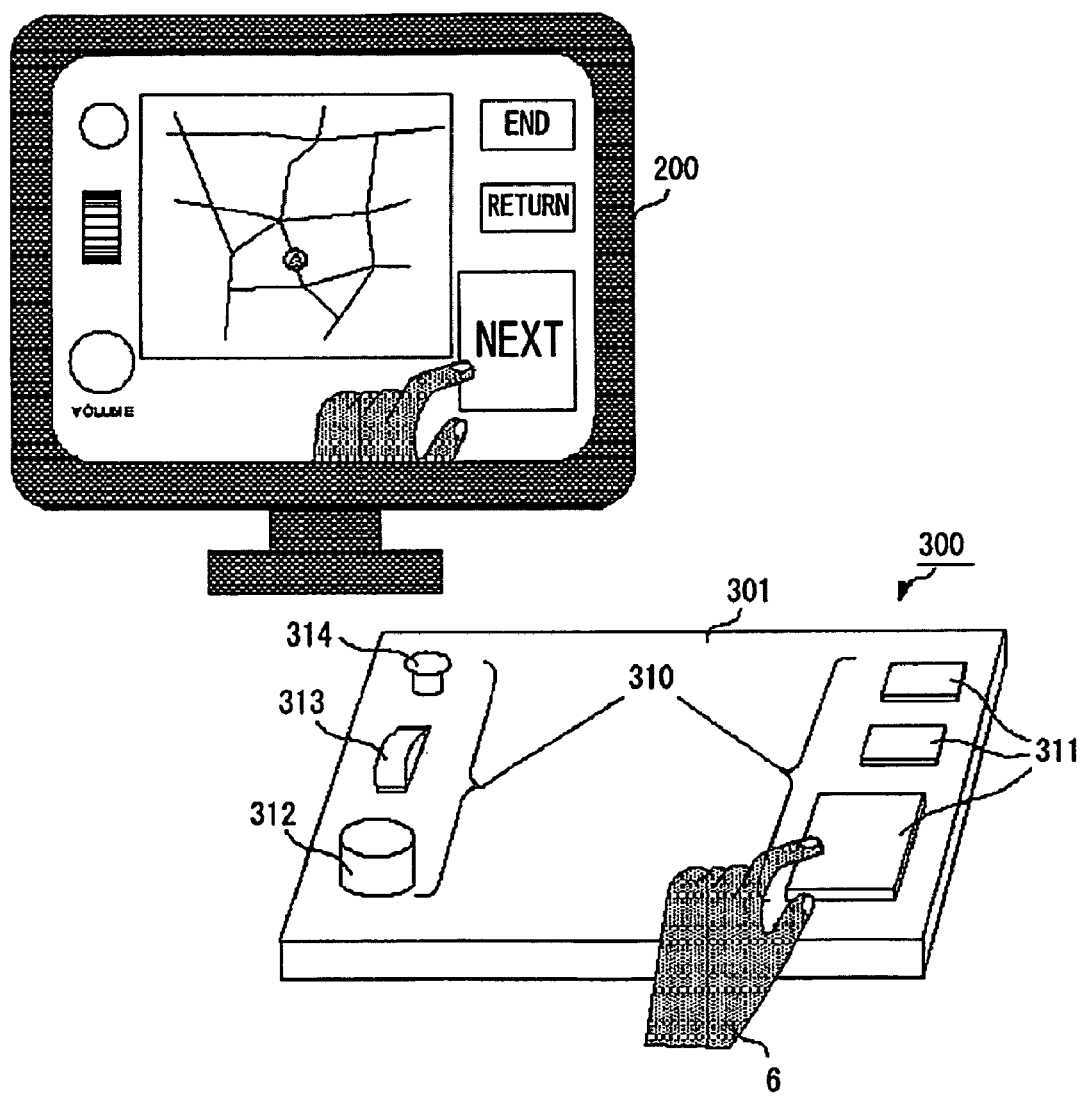
FIG. 21 shows an example of the operation section 300.

Next, an example of using the switches as the operation section 300 will be described. Referring to FIG. 21, the operation section 300 includes a base section 301 and a plurality of switches 310. The switches 310 may include, for example, button switches 311, a toggle switch, a rotary switch 312, a jog dial 313, and/or a joystick 314.

Corresponding to the positions of the switches 310 provided on the operation section 300, the GUI components are displayed on the display section 200. It is preferable that the shapes of the GUI components are the same as the shapes of the switches 310.

Note that it is always possible to arbitrarily change the functions of the GUI components displayed on the display section 200, as necessary. For example, the rotary switch 312 can be used as volume control means in an audio mode, and can be used as display magnification changing means of a map in a navigation mode.

As described above, the switches may be used as the operation section 300, whereby the user can perform the input operation while tactually sensing the behaviors of the switches, and thus it is possible to perform input more intuitively and more certainly than perform the input operation dependent only on a visual sense as that performed on a touchpad or the like.

Needless to say, the operation section 300 may include both the coordinate input device and the switches. For example, the coordinate input device may be further provided in the center of the base section 301 of FIG. 21. The coordinate input device and the switches may be combined, whereby it is possible to easily perform a selection operation of, for example, GUI components frequently used by the user and displayed fixedly on the display section 200 by providing, on the operation section 300, the switches corresponding to the frequently-used and fixedly-displayed GUI components and it is also possible to select the other GUI components by using the coordinate input device. As a result, it is possible to flexibly position the GUI components and efficiently use the display screen.

Calculation Section 400

Next, the calculation section 400 will be described. Note that the body shape extraction section 600 included in the calculation section 400 has already been described, and therefore will not be described here.

The process performed by the calculation section 400 has two main types: a process performed to display the image of the body portion of the user on the display section 200; and a process performed when the user has performed the input operation.

Figure 22:
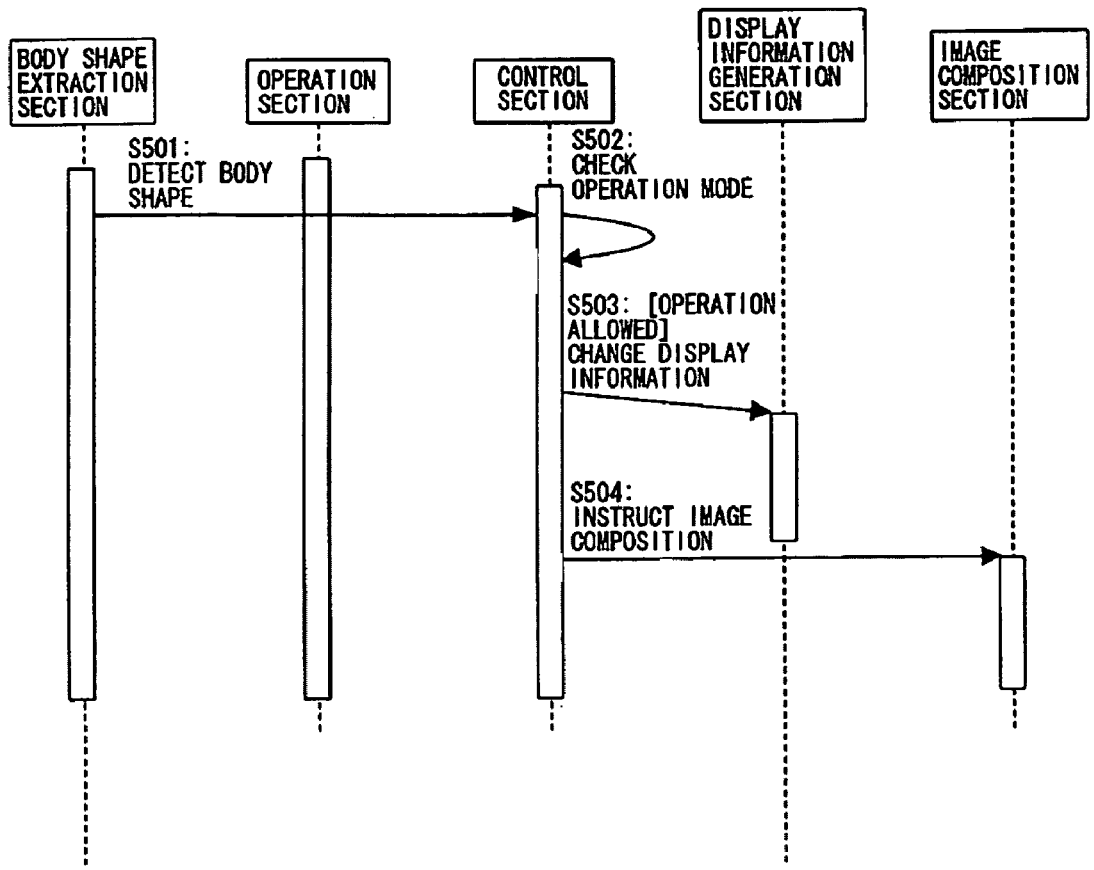
FIG. 22 is a sequence diagram showing the flow of the process performed by the control section 500 to display the body image.

First, with reference to a sequence diagram of FIG. 22, the flow of the process performed by the control section 500 to display the image of the body portion of the user on the display section 200 will be described.

When the body shape extraction section 600 detects the body shape (step S501), the body shape extraction section 600 sends a message to the control section 500 that the body shape has been detected. Here, the body shape extraction section 600 may detect the characteristics (the hand size, whether a left hand or a right hand, and the like) of the body shape and send the detected characteristics with the message to the control section 500.

Next, the control section 500 checks an operation mode at the time (step S502). Here, it is assumed that as the operation mode, two modes are provided: a mode of allowing the user to perform the input operation; and a mode of prohibiting the user from performing the input operation. Since a driver operating a car navigation device while in motion leads to danger, the user is, normally, prohibited from performing the input operation while in motion.

When it is determined as a result of the check of step S502 that the user is allowed to perform the input operation, the control section 500 instructs the display information generation section 700 to change the display information to be displayed on the display section 200 (step S503). The display information generation section 700 changes the display information in accordance with the instruction. Examples of the display information generation section 700 changing the display information will be described below.

Figure 23A:
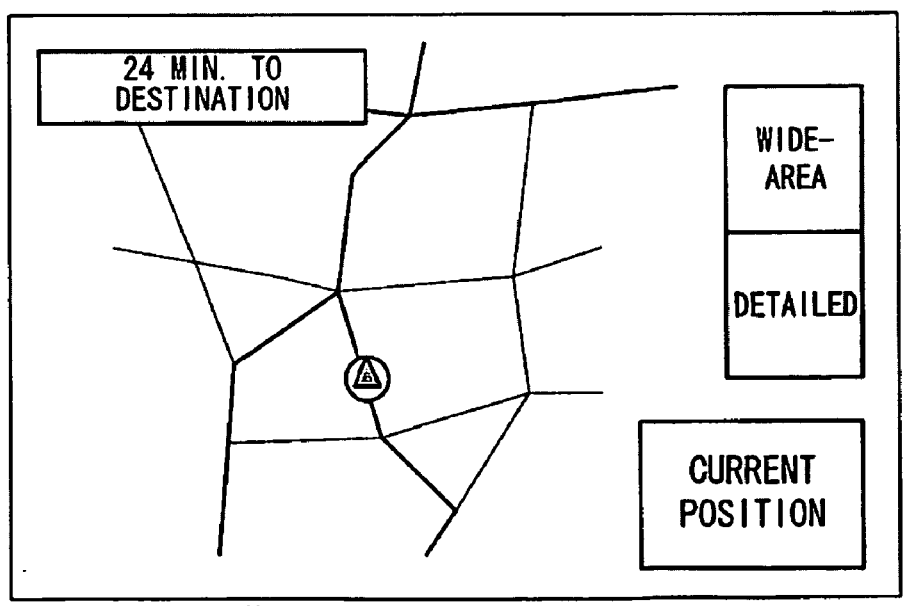
FIG. 23A shows an example of display information generated by a display information generation section 700 in the case where a body shape is not detected.
Figure 23B:
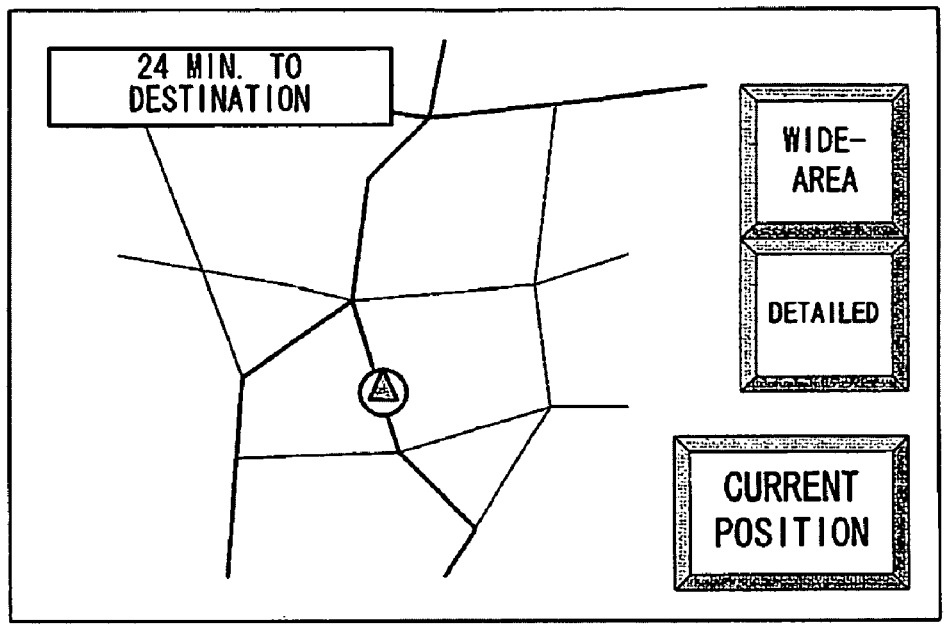
FIG. 23B shows an example of the display information generated by the display information generation section 700 in the case where the body shape is detected.

FIGS. 23A and 23B show a first example of changing the display information depending on whether the body shape extraction section 600 has detected the body shape (i.e., when the body portion of the user is present on the operation section 300) or has not detected the body shape (i.e., when the body portion of the user is not present on the operation section 300). FIG. 23A shows an example of screen display performed when the body shape extraction section 600 has not detected the body shape. Here, the contours of the GUI components (buttons in this case) selectable by the user are displayed with the same line type as that of a simple message display box with "24 min. to destination" written therein. FIG. 23B shows an example of screen display corresponding to FIG. 24A and performed when the body shape extraction section 600 has detected the body shape. Here, since the buttons are displayed in a three-dimensional manner, the user can recognize selection target areas at a glance. The display information may be changed as described above, whereby it is possible to improve the visibility of the display information by simplifying the display information when the user is not trying to perform the input operation, and it is also possible to improve the operability of the display information by displaying the selection target areas in a highlighted manner when the user is trying to perform the input operation.

Figure 24A:
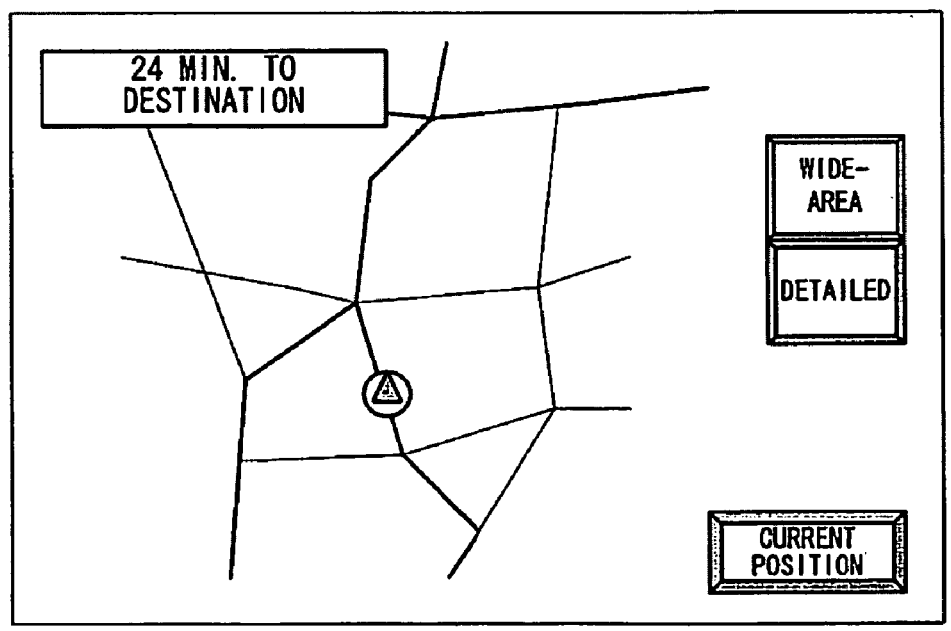
FIG. 24A shows an example of the display information generated by the display information generation section 700 in the case where the body shape is not detected.
Figure 24B:
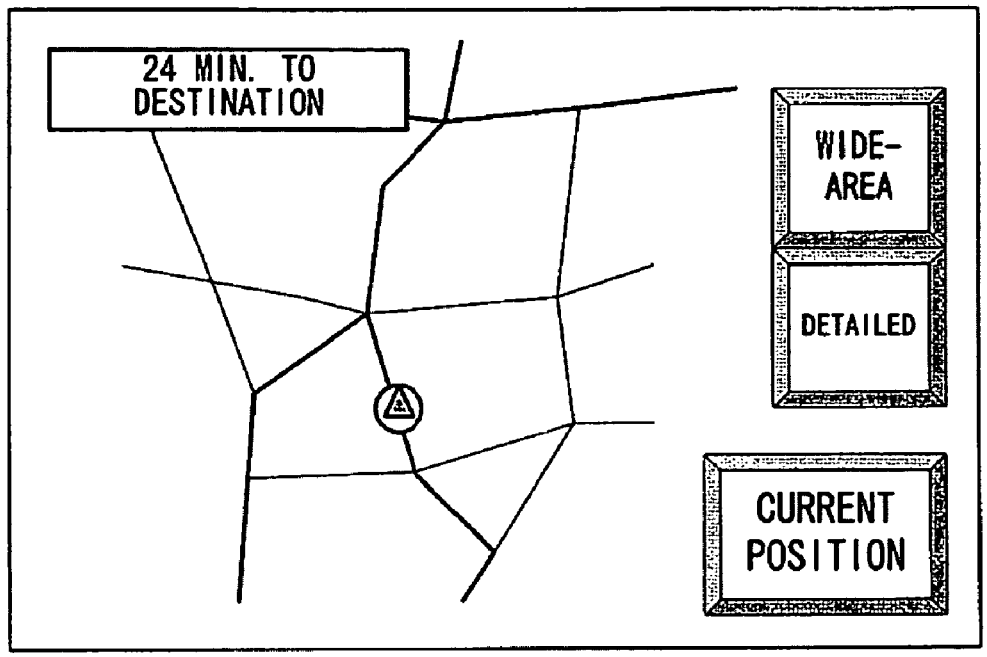
FIG. 24B shows an example of the display information generated by the display information generation section 700 in the case where the body shape is detected.

FIGS. 24A and 24B show a second example of changing the display information depending on whether the body shape extraction section 600 has detected the body shape (i.e., when the body portion of the user is present on the operation section 300) or has not detected the body shape (i.e., when the body portion of the user is not present on the operation section 300). FIG. 24A shows another example of the screen display performed when the body shape extraction section 600 has not detected the body shape. Here, the GUI components (buttons in this case) selectable by the user are displayed in a relatively small size. FIG. 24B shows an example of screen display corresponding to FIG. 23A and performed when the body shape extraction section 600 has detected the body shape. Here, since the buttons are displayed in a larger size than that of FIG. 24A, the user can select the buttons more easily. The display information may be changed as described above, whereby it is possible to make information other than the buttons easily viewable when the user is not trying to perform the input operation, and it is also possible to improve the operability of the display information by enlarging the buttons when the user is trying to perform the input operation.

Figure 25A:
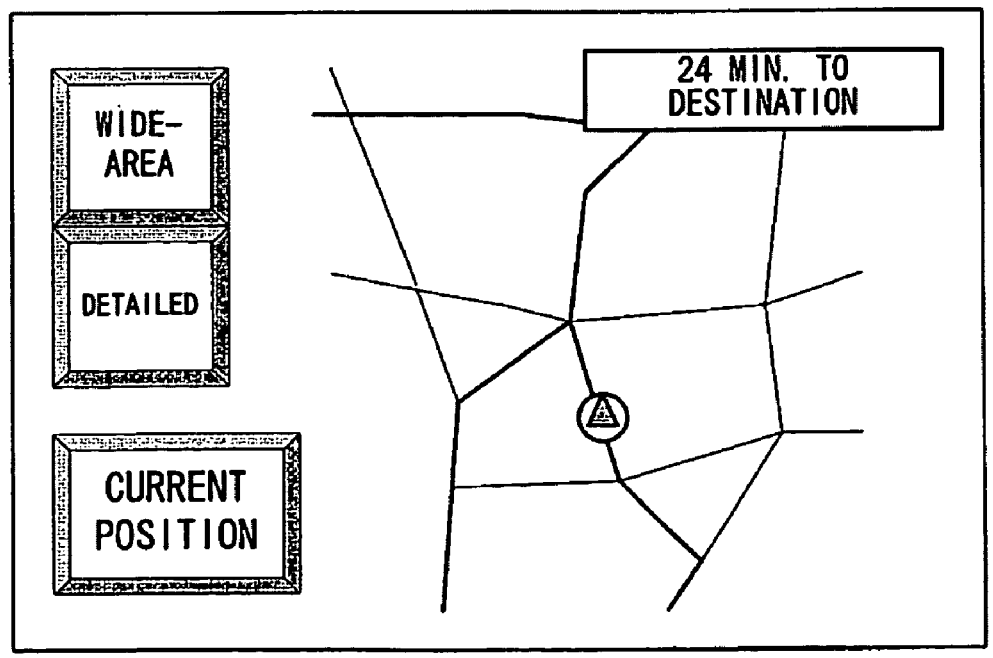
FIG. 25A shows an example of the display information generated by the display information generation section 700 in the case where a right hand is detected.
Figure 25B:
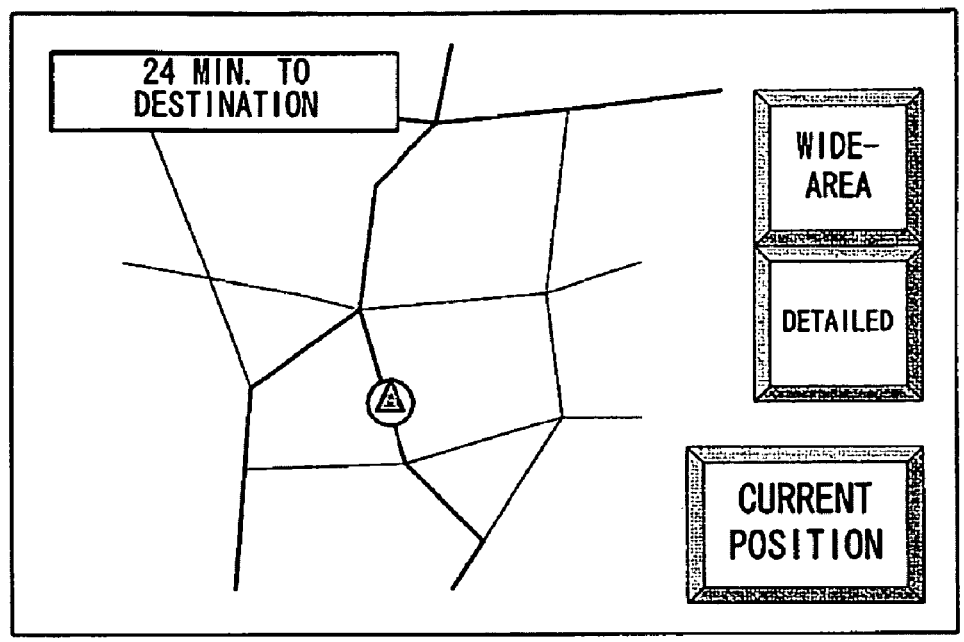
FIG. 25B shows an example of the display information generated by the display information generation section 700 in the case where a left hand is detected.

FIGS. 25A and 25B show an example of changing the display information depending on whether the body shape extraction section 600 has detected a right hand or a left hand. In this case, the body shape extraction section 600 determines whether the detected body shape is that of a right hand or that of a left hand, and then notifies the control section 500 of the determination result as the characteristics of the body shape. Based on the determination result, the control section 500 instructs the display information generation section 700 to change the display information. It is possible, by using a variety of existing algorithms based on the data as shown in FIGS. 14 and 15, to determine whether the detected body shape is that of a right hand or that of a left hand. FIG. 25A shows an example of screen display performed when the body shape extraction section 600 has detected a right hand, and FIG. 25B shows an example of screen display performed when the body shape extraction section 600 has detected a left hand. Here, as in the case where the operation section 300 is installed between the driver's seat and the passenger seat of the vehicle, it is assumed that two users are present on the left side and the right side of the operation section 300 such that the user present on the right side of the operation section 300 operates the operation section 300 with his/her left hand and the user present on the left side of the operation section 300 operates the operation section 300 with his/her right hand. That is, when the body shape extraction section 600 has detected a right hand, it is considered that the user operating the operation section 300 is present on the left side of the operation section 300. At this time, if the GUI components (buttons in this case) are displayed in the upper right of the display screen, the vicinity of the center of the operation section 300 is covered by the user's palm when the user is trying to press the buttons. As a result, the vicinity of the center of the display screen is covered by the hand image and the display screen becomes difficult to view. In response, to avoid the above problem, when the body shape extraction section 600 has detected a right hand, the buttons are displayed on the left side of the display screen as shown in FIG. 25A, and when on the other hand, the body shape extraction section 600 has detected a left hand, the buttons are displayed on the right side of the display screen as shown in FIG. 25B.

Note that in the above example, the location positions of the buttons are changed depending on whether the body shape extraction section 600 has detected a right hand or a left hand, but the functions, the shapes, the number, and the like of the buttons may be changed. For example, in the case where the operation section 300 is installed between the driver's seat and the passenger seat of the vehicle, when a right hand (i.e., the hand of the passenger on the passenger seat) is detected while the vehicle is in motion, both buttons requiring relatively complicated input operations such as character input and buttons requiring relatively easy input operations such as screen scrolling may be displayed. However, when a left hand (i.e., the hand of the driver) is detected while the vehicle is in motion, only buttons requiring relatively easy input operations may be displayed for safety's sake.

Figure 26A:
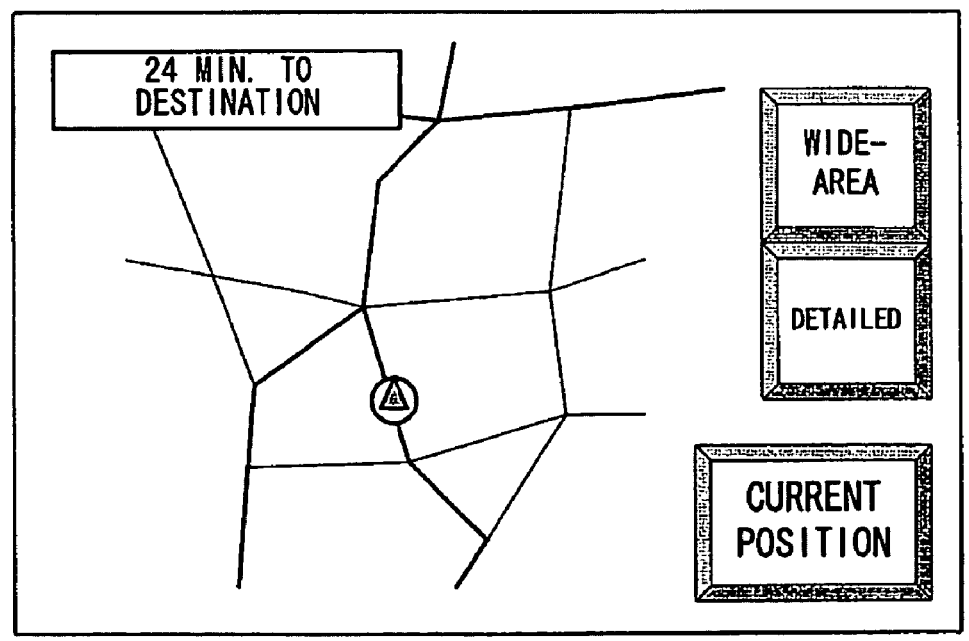
FIG. 26A shows an example of the display information generated by the display information generation section 700 in the case where a relatively large hand is detected.
Figure 26B:
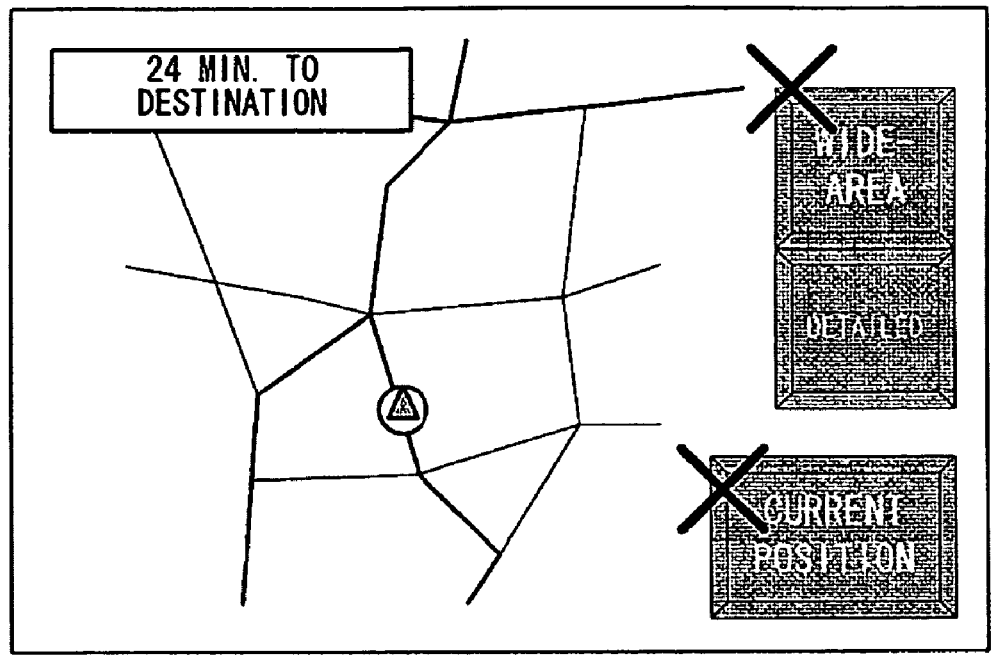
FIG. 26B shows an example of the display information generated by the display information generation section 700 in the case where a relatively small hand is detected.

FIGS. 26A and 26B show an example of changing the display information depending on whether the body shape extraction section 600 has detected a relatively large hand (i.e., the hand of an adult) or a relatively small hand (i.e., the hand of a child). In this case, the body shape extraction section 600 determines whether the detected body shape is that of a relatively large hand or that of a relatively small hand, and then notifies the control section 500 of the determination result as the characteristics of the body shape. Based on the determination result, the control section 500 instructs the display information generation section 700 to change the display information. For example, the area and the width of the body area 607 of FIG. 14 may be compared to a predetermined threshold, whereby it is possible to determine whether the detected body shape is that of a relatively large hand or that of a relatively small hand. FIG. 26A shows an example of screen display performed when the body shape extraction section 600 has detected a relatively large hand. When the body shape extraction section 600 has detected a relatively large hand, it is considered that an adult is trying to perform an operation, and thus the input operation is not particularly restricted. FIG. 26 shows an example of screen display performed when the body shape extraction section 600 has detected a relatively small hand. When the body shape extraction section 600 has detected a relatively small hand, it is considered that a child is trying to perform an operation, and thus some or all of the buttons are invalidated so as to limit the input operation. Further, the colors of the buttons are changed and markers are put, such that the user can recognize that the buttons are invalid.

Note that in the above example, when the body shape extraction section 600 has detected a relatively small hand, the colors of the buttons are changed and markers are put, but the present invention is not limited thereto and a variety of examples of changing the display information are possible. For example, it is possible to change difficult words included in the display information to easy words, and also it is possible to change a screen structure and the use of color to those for children.

Note that as another example of changing the display information, the display information generation section 700 may generate the display information only when the body shape extraction section 600 has detected the shape of a body portion. Consequently, the processes related to image display are stopped when the user does not perform the input operation, and thus it is possible to suppress consumption power. Similarly, the display information generation section 700 may generate the display information only when the body shape extraction section 600 has detected a right hand (or a left hand). Similarly, the display information generation section 700 may generate the display information only when the body shape extraction section 600 has detected the hand of an adult (or the hand of a child).

Note that the shape detected by the body shape extraction section 600 may not necessarily be the shape of a body portion. In response, it may be determined whether or not the shape detected by the body shape extraction section 600 is the shape of a body portion, and then the display information may be changed depending on whether the detected shape is the shape of a body portion or the shape of an object, not a body portion. For example, the display information generation section 700 may not generate the display information when the shape detected by the body shape extraction section 600 is not the shape of a body portion. It is possible, by the above-described pattern matching, to determine whether or not the shape detected by the body shape extraction section 600 is the shape of a body portion.

When the display information is changed, the control section 500 instructs the image composition section 800 to make a composite image of the body image generated by the body shape extraction section 600 and the display information generated (changed) by the display information generation section 700 (step S504). The image composition section 800 makes the composite image of the body image and the display information in accordance with the instruction. Examples of the composite image made by the image composition section 800 will be described below.

Figure 27A:
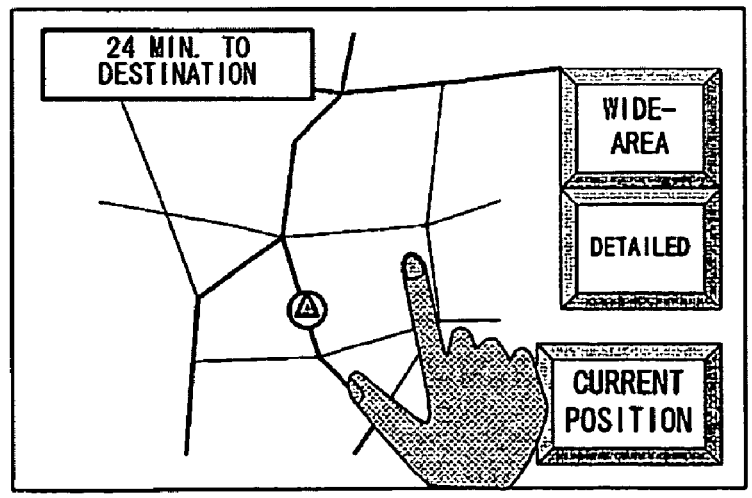
FIG. 27A shows an example of a composite image made by an image composition section 800.

FIG. 27A shows a screen example in the case where the body image (e.g., FIG. 18) generated by the body shape extraction section 600 is drawn over the display information generated by the display information generation section 700. A realistic hand image may be displayed as described above, whereby it is possible to give the user a feeling of actually contacting the display screen, and thus it is possible to perform an intuitive input operation.

FIG. 27B shows a screen example in the case where a contour image (e.g., FIG. 15) generated by the body shape extraction section 600 is drawn as the body image over the display information generated by the display information generation section 700. Based on the above-described image composition, it is easy to confirm the display information even during the operation, since the shape and the position of a body portion is displayed and also the display information included within the body image is displayed at the same time.

FIG. 27C shows a screen example in the case where the body image generated by the body shape extraction section 600 is processed such that the contour of the body image is made non-transparent and the inside of the body image is made semi-transparent, and then the processed body image is drawn over the display information generated by the display information generation section 700. Based on the above-described image composition, it is possible to perform an intuitive input operation and also it is easy to confirm the display information even during the operation.

FIG. 27D shows a screen display in the case where the contour image generated by the body shape extraction section 600 is processed such that a fingertip portion of the contour image is displayed in a highlighted manner, and then the processed contour image is drawn over the display information generated by the display information generation section 700. Based on the above-described image composition, the user can quickly confirm the position which he/she is trying to press, and also can easily confirm the display information even during the operation since also the display information included within the body image is displayed. Note that a possible method of detecting the fingertip portion may include that of specifying the fingertip portion from the shape of a contour by using a pattern matching method, or that of extracting a nail portion from the image data as shown in FIG. 13. Further, a method of displaying in a highlighted manner may include, for example, that of displaying a marker, changing colors, changing transparencies, performing display such that the closer to the end of the fingertip, the gradually deeper the color of the contour, or performing display such that the closer to the end of the fingertip, the gradually lower the transparency of the contour.

FIG. 27E shows a screen example in the case where a semi-transparent or non-transparent shadow is added to the body image generated by the body shape extraction section 600, and then the body image is drawn over the display information generated by the display information generation section 700. Based on the above-described image composition, it is possible to give the user a feeling of actually contacting the display screen.

Figure 27H:
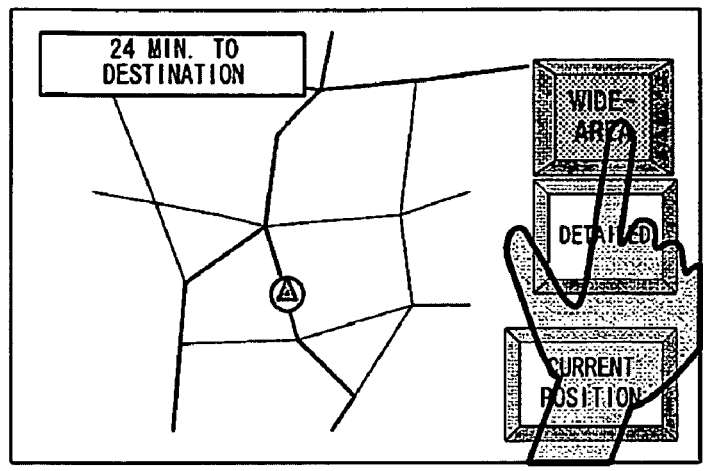
FIG. 27H shows an example of the composite image made by the image composition section 800.

In the above examples of FIGS. 27F through 27H, the body image is processed as necessary and then the processed body image is drawn over the display information generated by the display information generation section 700, but it is also possible to process an image other than the hand image during the image composition. Such examples will be described below.

FIG. 27F shows an example where near the GUI components, a portion or the whole of each of which is hidden if the body image generated by the body shape extraction section 600 is drawn over the display information, auxiliary information (information such as the labels and the auxiliary instructions of the GUI components) pops up. To perform the above-described display, first, the image composition section 800 determines, using a well-known algorithm, whether or not each of the GUI components included in the display information generated by the display information generation section 700 overlaps the body image. When a GUI component overlapping the body image is present, the image composition section 800 finds an area which is present away in a certain direction (a right direction, an upward direction, etc.) from the position of the overlapping GUI component and which does not overlap the body image, and then displays the auxiliary information regarding the overlapping GUI component in the found area. Based on the above-described image composition, the user can easily acquire information regarding an arbitrary GUI component displayed on the display screen, by causing the body image to overlap the arbitrary GUI component. Further, it is possible, without moving a hand, to identify the GUI components hidden behind the body image, and thus the operability is improved.

FIG. 27G shows an example where the labels of the GUI components, a portion or the whole of each of which is hidden if the body image generated by the body shape extraction section 600 is drawn over the display information, are drawn over the body image. Note that in the example of FIG. 27G, only the labels of the hidden GUI components are drawn over the body image, but the shapes of the hidden GUI components may also be additionally drawn over the body image. Based on the above-described image composition, the user can, without moving a hand, identify the GUI components hidden behind the body image, and thus the operability is improved.

FIG. 27H shows an example where the body image generated by the body shape extraction section 600 is drawn over the display information such that the GUI component overlapping the fingertip portion of the body image is displayed in a highlighted manner. Based on the above-described image composition, the user can easily confirm on which one of the GUI components a fingertip of the body image is positioned. A possible method of detecting the position of the fingertip portion may include that of specifying the fingertip portion from the shape of a contour by using a pattern matching method, or that of extracting a nail portion from image data as shown in FIG. 13. Further, it is possible to perform display in a highlighted manner by a variety of methods such as changing colors, changing transparencies, changing shapes, changing line types and line thicknesses, changing character styles, changing icons, and successively changing colors or transparencies (gradations).

Figure 28:
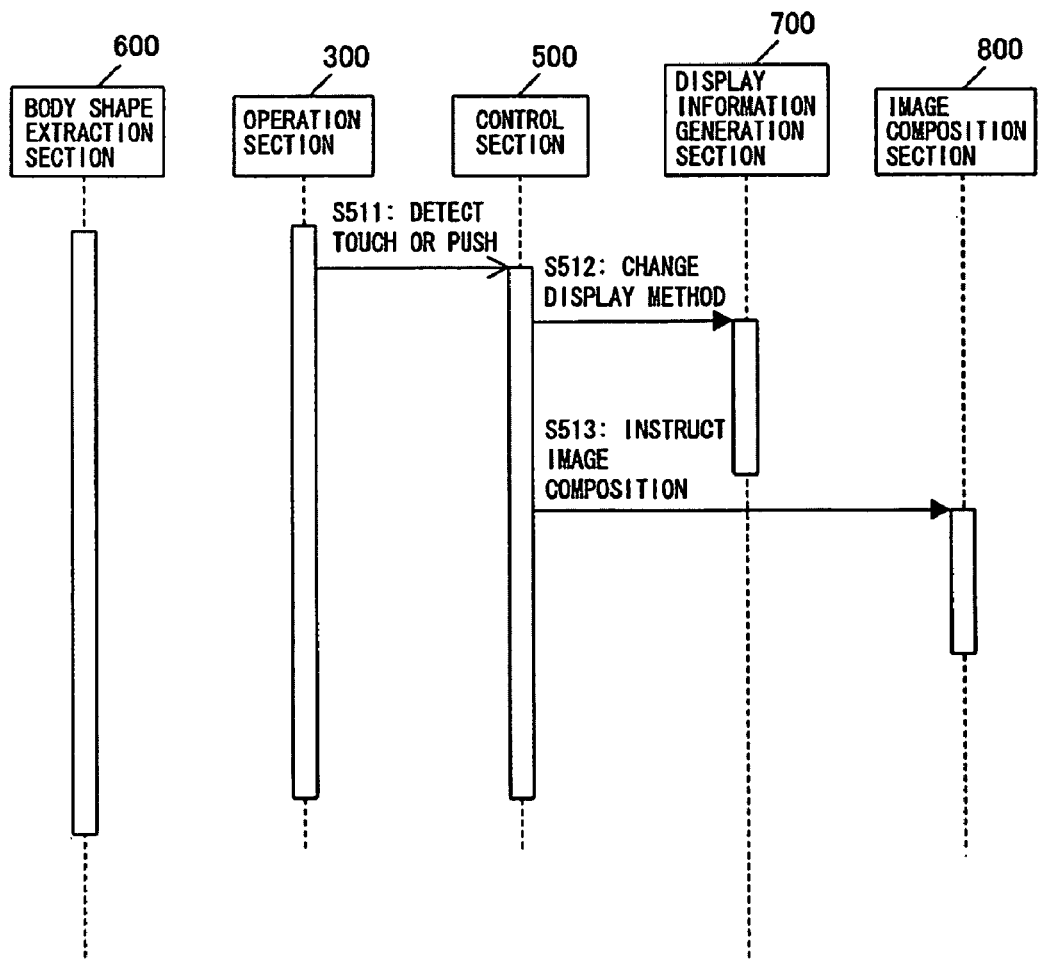
FIG. 28 is a sequence diagram showing the flow of the process performed by the control section 500 when an input operation performed by the user is detected.

Next, with reference to a sequence diagram of FIG. 28, the flow of the process performed by the control section 500 when the user performs the input operation will be described.

First, when detecting a contact operation or a press operation each performed by the user (step S511), the operation section 300 sends a message to the control section 500. Note, however, that as described above, the operation section 300 may simply output only the coordinate data to the control section 500 and the control section 500 may sense the contact operation and the like based on the outputted coordinate data.

Figure 29A:
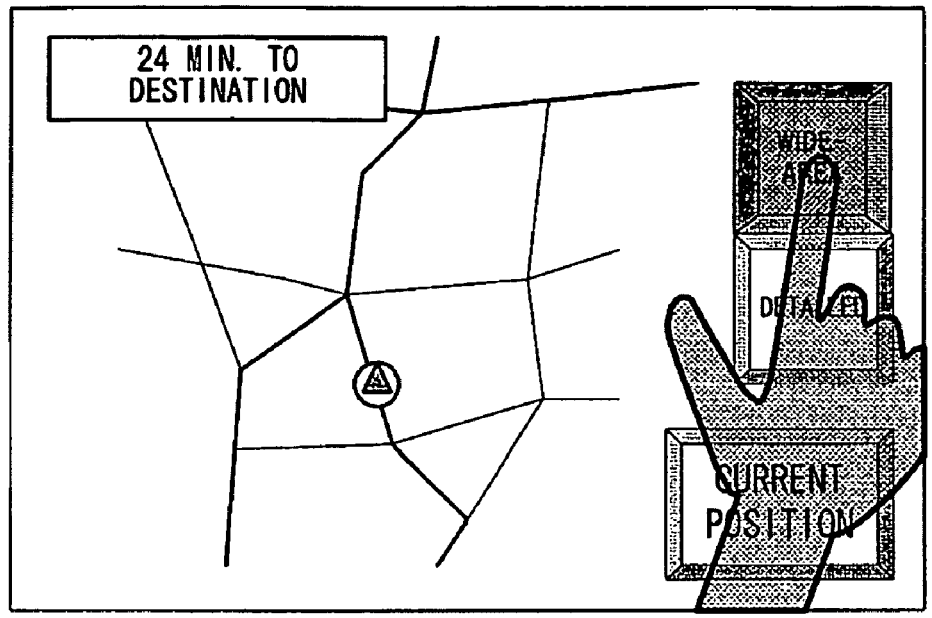
FIG. 29A shows an example of the display information generated by the display information generation section 700 when the user performs the input operation.
Figure 29B:
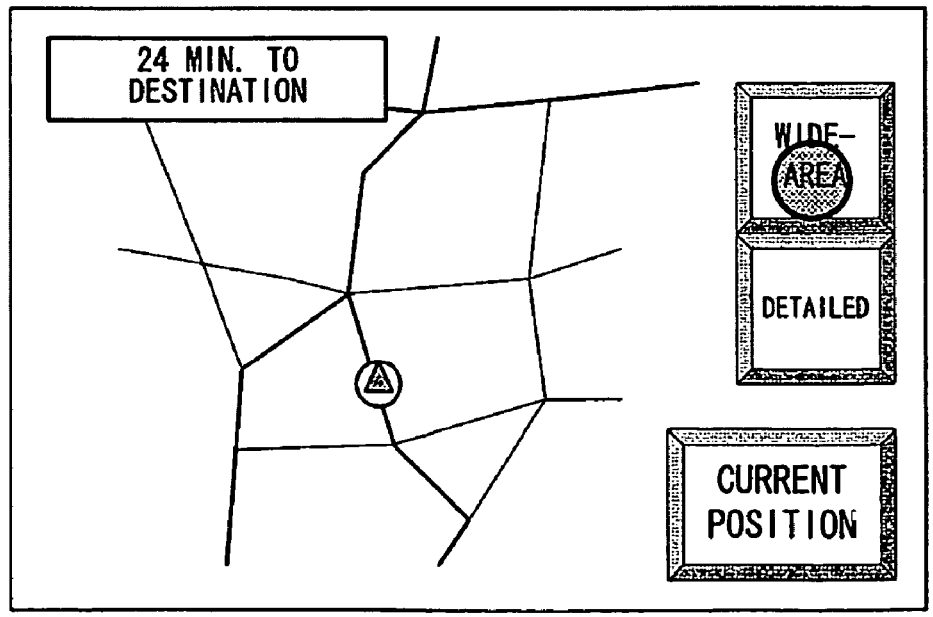
FIG. 29B shows an example of the display information generated by the display information generation section 700 when the user performs the input operation.

Next, the control section 500 instructs the display information generation section 700 to change the display information (step S512). The display information generation section 700 changes the display information in accordance with the instruction of the control section 500. With reference to FIGS. 29A and 29B, examples of changing the display information in this case will be described.

FIG. 29A shows an example where the GUI component (i.e., the GUI component selected by the user) corresponding to the point on the operation section 300 which is contacted (or pressed) by the user is displayed in a highlighted manner. In the example of FIG. 29A, the GUI component (a button in this case) selected by the user is changed to an image of the button being pressed. Note that although a hand image is shown in FIG. 29A for convenience, the hand image is, in practice, not included in the display information generated by the display information generation section 700. Based on the above-described change of the display information, the user can easily confirm whether or not he/she has correctly selected the GUI component which he/she was trying to select, and thus the operability is improved.

FIG. 29B shows an example where the point on the display screen which corresponds to the point on the operation section 300 which is contacted (or pressed) by the user is displayed in a highlighted manner. In the example of FIG. 29B, over the point on the display screen which corresponds to the point on the operation section 300 which is contacted (or pressed) by the user, a circular marker is drawn as if a fingerprint is left. The circular marker remains displayed until a certain period of time has passed since the circular marker was displayed or until the user contacts (or presses) the operation section 300 again. Based on the above-described change of the display information, the user can easily confirm whether or not he/she has correctly selected the point on the display screen which he/he was trying to specify. Particularly, when the actually specified point deviates from the point which the user was trying to specify, it is possible to confirm the direction and the distance of the deviation.

When the display information is changed, the control section 500 instructs the image composition section 800 to make a composite image of the body image generated by the body shape extraction section 600 and the display information generated by the display information generation section 700 (step S513). The image composition section 800 makes the composite image of the body image and the display information in accordance with the above instruction.

Figure 30A:
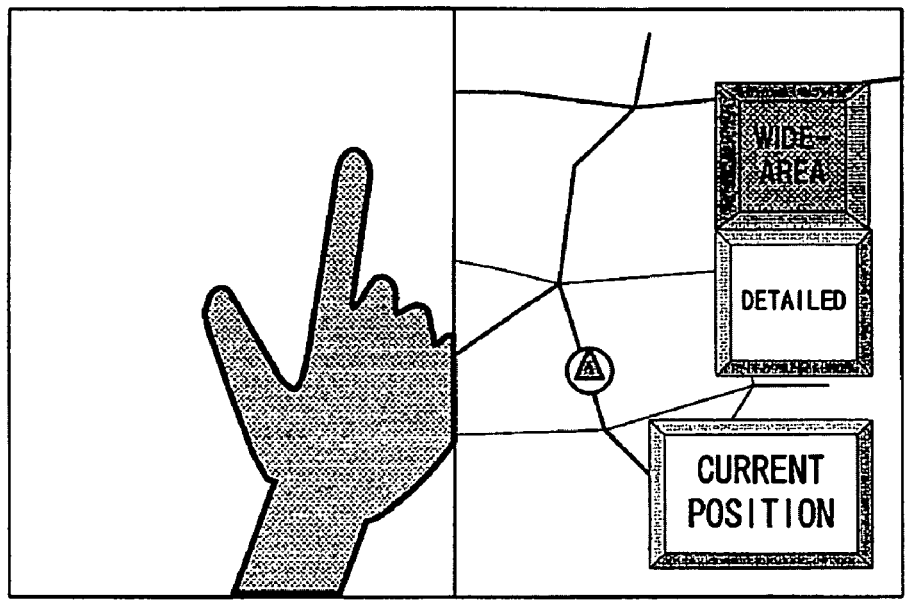
FIG. 30A shows an example of display performed in the case where the body shape is displayed in a composite manner in only the range of an operation target.

FIG. 30A shows an example of display performed when the body shape is displayed in a composite manner not on the whole display section but only in the range of an operation target. Here, the display section is divided into two screens: a television on the left side; and the map screen of a car navigator on the right side. If the hand shape is displayed on the navigator side when the user is trying to operate the television, unnecessary display performed in an overlapping manner is a disturbance, and therefore the hand shape may not be displayed on the navigator side. Further, in this case, based on the above-described fingertip position detection method, it is possible to determine that the current operation target is the television when the fingertip is present on the television side. Thus, the range of making the composite image may be limited to the television side or the car navigator side in accordance with the fingertip position.

Figure 30B:
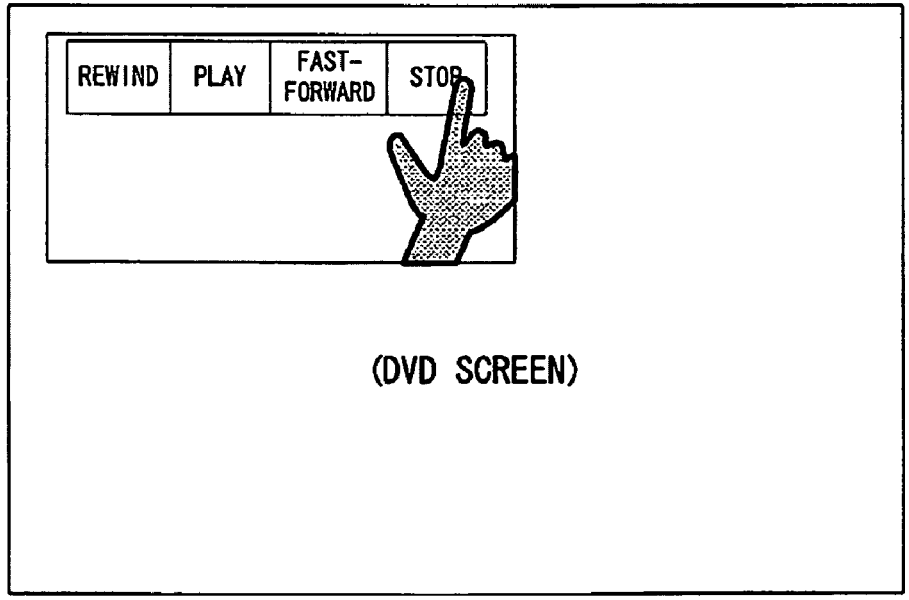
FIG. 30B shows an example of display performed in the case where the body shape is displayed in a composite manner in the range of the operation target by being reduced.

FIG. 30B shows an example of display performed when the body shape is displayed in a composite manner not on the whole display section but in the range of the operation target by being reduced. Here, a DVD screen will be described as an example. When the operation section is contacted or a hand is held over the operation section, a sub-screen for a DVD operation appears on the upper portion of the display screen.

Since no operation target is present and DVD is being reproduced in the portion other than the sub-screen, if the hand shape is displayed therein in a composite manner, display is disturbed. In response, while the sub-screen is displayed, the shape correction process described in S608 performs the viewpoint conversion process based on the size of the sub-screen. Consequently, it is possible to display the hand shape in a composite manner on only the sub-screen.

As described above, based on the present invention, it is possible to provide an input device capable of, even when the hand of a user goes beyond an operation surface, performing input by accurately sensing a hand shape and a gesture, and its method.

The structures described in the foregoing embodiments are merely illustrative and not restrictive. An arbitrary structure can be applied within the scope of the present invention.

INDUSTRIAL APPLICABILITY

An input device of the present invention can perform an intuitive input operation such as that of touch panel display without directly contacting a display screen, and therefore is suitable for performing an input operation remotely from a display, for using a far-focus display as display means, and the like. Further, since it is not required to look at a hand during the input operation, the input device of the present invention is also suitable for an input device and the like of a car navigation device.

The invention claimed is:

1. An input device for inputting a command and information to a device, the input device comprising:
    a touchpad including an operation section having an operation surface for receiving an operation input from a user, such that the operation input is received from the user by the user touching one or more points of a plurality of points on the operation surface of the touchpad, and such that the touchpad outputs coordinate data representing the one or more points on the operation surface touched by the user;
    a body shape input section for acquiring image data of a range that is wider than the operation surface of the operation section for receiving the operation input from the user;
    a body shape extraction section for recognizing a shape of a body portion of the user from the acquired image data, extracting a portion, of the recognized body portion, corresponding to an operation range of the operation surface from the acquired image data, and generating a body image based on the extracted portion;
    a display image generation section for generating a display image, which is a display range corresponding to the operation range of the operation surface and which is necessary for the user to input the command and the information;
    an image composition section for making a composite image of the display image generated by the display image generation section and the body image generated by the body shape extraction section;
    a display section for displaying the composite image made by the image composition section; and
    a calculation section for inputting the command and the information to the device by recognizing the operation input of the user performed on the operation surface of the operation section by the user based on the coordinate data, or recognizing, from the acquired image data, the operation input of the user performed on the input device by a gesture of the user,
    wherein each of the plurality of points on the operation surface of the touchpad correspond in a one-to-one manner to a plurality of points on a display screen of the display section, such that when the user touches a certain point on the operation surface of the touchpad, the coordinate data represents a contact position of the certain point on the operation surface of the touchpad in relation to a location on the display screen.

2. The input device according to claim 1, wherein the body shape extraction section determines, by pattern matching using shape patterns of the body portion which are stored in advance, whether or not the portion extracted from the acquired image data outputted from the body shape input section is the shape of the body portion.

3. The input device according to claim 2, wherein, based on the shape patterns, the body shape extraction section corrects the shape of the body portion, which is extracted from the acquired image data outputted from the body shape input section.

4. The input device according to claim 1,
    wherein a marker is put at a predetermined position on the operation section, so as to be used in a shape correction process, and
    wherein the body shape extraction section performs the shape correction process, such that the predetermined position of the marker included in the acquired image data outputted from the body shape input section is converted into a predetermined position on the display screen of the display section.

5. The input device according to claim 1, wherein, in accordance with the shape of the body portion, which is recognized by the body shape extraction section, the display image generation section changes the display image to be generated.

6. The input device according to claim 1, wherein the display image generation section generates the display image only when the shape of the body portion, which is recognized by the body shape extraction section, is a shape of a right hand or a shape of a left hand.

7. The input device according to claim 1, wherein, based on the shape of the body portion, which is recognized by the body shape extraction section, the display image generation section displays a GUI component included in the display image in a highlighted manner, changes a position of the GUI component, or changes a validity of the GUI component.

8. The input device according to claim 1,
    wherein the display image generation section generates the display image including a plurality of display areas divided based on operation targets, and
    wherein the image composition section detects a fingertip portion of the user in the body image and makes the composite image of the display image and the body image in only a display area in which the detected fingertip portion is present.

9. The input device according to claim 1,
    wherein the display information generation section generates the display image including a plurality of display areas divided based on operation targets, and
    wherein the image composition section reduces the body image and makes the composite image of the reduced body image and the display image in an area, which is a current operation target.

10. The input device according to claim 1,
    wherein the body image extracted from the acquired image data includes an actual image of the user's hand, and
    wherein the image composition section uses at least a portion of the actual image of the user's hand from the body image as a portion of the composite image displayed on the display screen, such that actual image data of the user's hand is displayed on the display screen.

11. The input device according to claim 1, wherein the image composition section adds shadowing or masking to the body image, such that the body image including the shadowing or masking is drawn over the display image generated by the display image information generation section.

12. An input method of using an input device for inputting a command and information to a device, the input device comprising a touchpad including an operation section having an operation surface, and the input method comprising:
- a receiving step of receiving, via the touchpad, an operation input from a user, such that the operation input is received from the user by the user touching one or more points of a plurality of points on the o eration surface of the touchpad, and such that the touchpad outputs coordinate data representing the one or more points on the operation surface touched by the user;
- a body shape inputting step of acquiring image data of a range that is wider than the operation surface of the operation section for receiving the operation input from the user;
- a body shape extracting step of recognizing a shape of a body portion of the user from the acquired image data, extracting a portion, of the recognized body portion, corresponding to an operation range of the operation surface from the acquired image data, and generating a body image based on the extracted portion;
- a display image generating step of generating a display image, which a display range corresponding to the operation range of the operation surface and which is necessary for the user to input the command and the information;
- an image composition step of making a composite image of the display image generated in the display image generating step and the body image generated in the body shape extraction step;
- a display step of displaying the composite image made in the image composition step; and
- a calculating step of inputting the command and the information to the device by recognizing the operation input of the user performed on the operation surface of the operation section by the user based on the coordinate data, or recognizing, from the acquired image data, the operation input of the user performed on the input device by a gesture of the user, wherein each of the plurality of points on the operation surface of the touchpad correspond in a one-to-one manner to a plurality of points on a display screen of the display section, such that when the user touches a certain point on the operation surface of the touchpad, the coordinate data represents a contact position of the certain point on the operation surface of the touchpad in relation to a location on the display screen.

* * * * *